(12) United States Patent
Groeneweg et al.

(10) Patent No.: US 10,352,779 B2
(45) Date of Patent: *Jul. 16, 2019

(54) INTEGRATED RAIL EFFICIENCY AND SAFETY SUPPORT SYSTEM

(71) Applicant: Concaten, Inc., Golden, CO (US)

(72) Inventors: Kevin K. Groeneweg, Golden, CO (US); Christopher J. Rennie, Seattle, WA (US)

(73) Assignee: Concaten, Inc., Golden, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/991,868

(22) Filed: May 29, 2018

(65) Prior Publication Data

US 2018/0274989 A1 Sep. 27, 2018

Related U.S. Application Data

(63) Continuation of application No. 14/645,042, filed on Mar. 11, 2015, now Pat. No. 9,989,426, which is a
(Continued)

(51) Int. Cl.
*B61K 9/06* (2006.01)
*G01K 13/00* (2006.01)
(Continued)

(52) U.S. Cl.
CPC .......... *G01K 13/00* (2013.01); *B61L 23/042* (2013.01); *B61L 27/0088* (2013.01); *H04L 67/12* (2013.01)

(58) Field of Classification Search
CPC .......... B61L 3/16; B61L 23/04; B61L 23/042; B61L 23/18; B61L 27/00; B61L 27/0088;
(Continued)

(56) References Cited

U.S. PATENT DOCUMENTS 3,160,964 A 12/1964 Boyer et al.
3,344,993 A 10/1967 Wilder et al.
(Continued)

FOREIGN PATENT DOCUMENTS

CA 2060418 5/1994
CA 2233689 4/1997
(Continued)

OTHER PUBLICATIONS

International Preliminary Report on Patentability for International (PCT) Application. No. PCT/US08/88670, dated Jul. 15, 2010.
(Continued)

*Primary Examiner* — Gail Kaplan Verbitsky
(74) *Attorney, Agent, or Firm* — Carl A. Hjort, III

(57) ABSTRACT

Embodiments of an integrated rail efficiency and safety support system and method are shown comprising a server operable to receive a plurality of sets of collected information, each of the sets of collected information comprising a consist physical location and weather conditions and rail temperatures in an area of the respective consist and to process a predictive rail temperature algorithm for predicting a rail temperature and/or a trend in rail temperature for a selected section of track; and wherein the predictive rail temperature algorithm factors the information provided to it and provides a predicted rail temperature and/or trend in rail temperature for the selected section of track.

20 Claims, 6 Drawing Sheets

Related U.S. Application Data continuation of application No. 13/560,829, filed on Jul. 27, 2012, now Pat. No. 8,979,363, which is a continuation of application No. 12/347,695, filed on Dec. 31, 2008, now Pat. No. 8,231,270.

(60) Provisional application No. 61/030,822, filed on Feb. 22, 2008, provisional application No. 61/140,539, filed on Dec. 23, 2008, provisional application No. 61/018,796, filed on Jan. 3, 2008.

(51) Int. Cl.
  *B61L 23/04* (2006.01)
  *B61L 27/00* (2006.01)
  *H04L 29/08* (2006.01)

(58) Field of Classification Search
  CPC ....... B61L 27/04; B23Q 11/0003; B61K 9/00; B61K 9/08; B61K 9/10; B61K 9/06; G01K 13/00; G05B 13/02; H04L 67/12
  USPC .......... 340/905; 374/16, 109, 120, 121, 124, 374/129, 141, 142, 143, 1; 701/19, 20; 702/130, 184, 99, 3
  See application file for complete search history.

(56) References Cited

U.S. PATENT DOCUMENTS

| | | |
|---|---|---|
| 3,420,451 A | 1/1969 | Kahlbacher |
| 3,451,470 A * | 6/1969 | Herrick .................. E01B 31/18 104/2 |
| 3,459,375 A | 8/1969 | Goffin |
| 3,519,169 A | 7/1970 | Holland |
| 3,540,655 A | 11/1970 | Hinrichs |
| 3,559,894 A | 2/1971 | Murray et al. |
| 3,655,130 A | 4/1972 | Patrick |
| 3,776,421 A | 12/1973 | Harrison et al. |
| 3,776,431 A | 12/1973 | Riley |
| 3,856,206 A | 12/1974 | Bell et al. |
| 3,891,979 A | 6/1975 | Braun et al. |
| 3,995,569 A | 12/1976 | Picardat |
| 4,052,003 A | 10/1977 | Steffen |
| 4,077,139 A | 3/1978 | Fagervold et al. |
| 4,084,748 A | 4/1978 | Anderson et al. |
| 4,176,791 A | 12/1979 | Cattaneo et al. |
| 4,209,065 A | 6/1980 | Ledent |
| 4,210,284 A | 7/1980 | Tarnay et al. |
| 4,230,280 A | 10/1980 | Leigh et al. |
| 4,234,109 A | 11/1980 | Goodhart |
| 4,260,107 A | 4/1981 | Jackson |
| 4,274,091 A | 6/1981 | Decker |
| 4,274,901 A | 6/1981 | Elber |
| 4,327,865 A * | 5/1982 | Greene .................. E01B 9/306 238/287 |
| 4,373,668 A | 2/1983 | Forbes et al. |
| 4,376,007 A | 3/1983 | Eigenmann |
| 4,391,393 A | 7/1983 | Filmyer |
| 4,422,562 A | 12/1983 | Rawson |
| 4,442,979 A | 4/1984 | Kupper |
| 4,473,319 A | 9/1984 | Spangler |
| 4,491,275 A | 1/1985 | Holsworth |
| 4,492,952 A | 1/1985 | Miller |
| 4,503,806 A | 3/1985 | Prusak et al. |
| 4,523,280 A | 6/1985 | Bachman |
| 4,529,336 A | 7/1985 | Shinozaki et al. |
| 4,553,702 A | 11/1985 | Coffee et al. |
| 4,577,781 A | 3/1986 | Braun |
| 4,588,127 A | 5/1986 | Ehrat |
| 4,678,056 A | 7/1987 | Kobari et al. |
| 4,684,062 A | 8/1987 | Bagwell |
| 4,690,553 A | 9/1987 | Fukamizu et al. |
| 4,700,223 A | 10/1987 | Shoutaro et al. |
| 4,700,895 A | 10/1987 | Takata |
| 4,733,760 A | 3/1988 | Inagaki et al. |
| 4,768,716 A | 9/1988 | Buchanan, Jr. et al. |
| 4,803,626 A | 2/1989 | Bachman et al. |
| 4,805,088 A | 2/1989 | Cross et al. |
| 4,809,197 A | 2/1989 | Tashiro et al. |
| 4,829,434 A | 5/1989 | Karmel et al. |
| 4,829,684 A | 5/1989 | Gruber |
| 4,881,371 A | 11/1989 | Haeder et al. |
| 4,898,333 A | 2/1990 | Kime et al. |
| 4,955,538 A | 9/1990 | Laube et al. |
| 4,984,163 A | 1/1991 | Kuwana et al. |
| 5,012,977 A | 5/1991 | Karklins et al. |
| 5,028,017 A | 7/1991 | Simmons et al. |
| 5,069,392 A | 12/1991 | Wise et al. |
| 5,096,125 A | 3/1992 | Wise et al. |
| 5,186,396 A | 2/1993 | Wise et al. |
| 5,267,696 A | 12/1993 | Balmer |
| 5,310,113 A | 5/1994 | Cowgur |
| 5,318,226 A | 6/1994 | Kime et al. |
| 5,331,331 A | 7/1994 | Wu |
| 5,334,987 A | 8/1994 | Teach |
| 5,343,744 A | 9/1994 | Ammann |
| 5,366,039 A | 11/1994 | Sawada |
| 5,386,727 A | 2/1995 | Searle |
| 5,416,475 A | 5/1995 | Tolbert et al. |
| 5,416,476 A | 5/1995 | Rendon |
| 5,439,312 A | 8/1995 | Marcato |
| 5,447,272 A | 9/1995 | Ask |
| 5,449,049 A | 9/1995 | Every |
| 5,452,966 A | 9/1995 | Swisher, Jr. |
| RE35,100 E | 11/1995 | Monson et al. |
| 5,469,371 A | 11/1995 | Bass |
| 5,515,043 A | 5/1996 | Berard et al. |
| 5,515,623 A | 5/1996 | Weeks |
| 5,521,594 A | 5/1996 | Fukushima |
| 5,603,452 A | 2/1997 | Hester |
| 5,606,307 A | 2/1997 | Kuan |
| 5,619,193 A | 4/1997 | Doherty et al. |
| 5,652,522 A | 7/1997 | Kates et al. |
| 5,653,389 A | 8/1997 | Henderson et al. |
| 5,684,476 A | 11/1997 | Anderson |
| 5,699,056 A | 12/1997 | Yoshida |
| 5,717,737 A | 2/1998 | Doviak et al. |
| 5,745,051 A | 4/1998 | Doherty et al. |
| 5,746,539 A | 5/1998 | Mara |
| 5,774,070 A | 6/1998 | Rendon |
| 5,794,172 A * | 8/1998 | Matheson et al. .. B61L 27/0016 246/2 R |
| 5,796,344 A | 8/1998 | Mann et al. |
| 5,818,339 A | 10/1998 | Giles et al. |
| 5,844,473 A | 12/1998 | Kaman |
| 5,904,296 A | 5/1999 | Doherty et al. |
| 5,927,209 A * | 7/1999 | Cotsford ................. E01B 29/16 104/17.2 |
| 5,928,504 A | 7/1999 | Hembre et al. |
| 5,931,393 A | 8/1999 | Alsip et al. |
| 5,931,882 A | 8/1999 | Fick et al. |
| 5,947,391 A | 9/1999 | Beck et al. |
| 5,947,931 A | 9/1999 | Bierman |
| 5,952,565 A | 9/1999 | Huber et al. |
| 5,955,973 A | 9/1999 | Anderson |
| 5,956,664 A * | 9/1999 | Bryan ................. B61L 23/044 340/870.16 |
| 5,957,621 A | 9/1999 | Clark, Jr. et al. |
| 5,982,325 A | 11/1999 | Thornton et al. |
| 6,012,012 A | 1/2000 | Fleck et al. |
| 6,029,111 A | 2/2000 | Croyle |
| 6,064,970 A | 5/2000 | McMillan et al. |
| 6,089,743 A | 7/2000 | McQuinn |
| 6,092,745 A | 7/2000 | Seymour et al. |
| 6,131,136 A | 10/2000 | Liebenow et al. |
| 6,166,627 A | 12/2000 | Reeley |
| 6,166,657 A | 12/2000 | Mann |
| 6,173,904 B1 | 1/2001 | Doherty et al. |
| 6,198,920 B1 | 3/2001 | Doviak et al. |
| 6,236,365 B1 | 5/2001 | LeBlanc et al. |
| 6,236,907 B1 | 5/2001 | Hauwiller et al. |
| 6,236,933 B1 | 5/2001 | Lang |
| 6,246,938 B1 | 6/2001 | Giletta et al. |
| 6,253,129 B1 | 6/2001 | Jenkins et al. |

(56) References Cited

U.S. PATENT DOCUMENTS

| | | |
|---|---|---|
| 6,317,684 B1 | 11/2001 | Roeseler et al. |
| 6,330,499 B1 | 12/2001 | Chou et al. |
| 6,354,786 B1 | 3/2002 | Feller |
| 6,356,823 B1 | 3/2002 | Iannotti et al. |
| 6,377,881 B1 | 4/2002 | Mullins |
| 6,384,739 B1 | 5/2002 | Roberts |
| 6,418,324 B1 | 7/2002 | Doviak et al. |
| 6,429,773 B1 | 8/2002 | Schuyler |
| 6,429,812 B1 | 8/2002 | Hoffberg |
| 6,470,272 B2 | 10/2002 | Cong et al. |
| 6,472,982 B2 | 10/2002 | Eida et al. |
| 6,497,368 B1 | 12/2002 | Friend et al. |
| 6,535,141 B1 | 3/2003 | Doherty |
| 6,538,578 B1 | 3/2003 | Doherty |
| 6,546,425 B1 | 4/2003 | Hanson et al. |
| 6,556,899 B1 | 4/2003 | Harvey et al. |
| 6,567,035 B1 | 5/2003 | Elliott |
| 6,587,785 B2 | 7/2003 | Jijina et al. |
| 6,611,739 B1 | 8/2003 | Harvey et al. |
| 6,611,740 B2 | 8/2003 | Lowry et al. |
| 6,631,322 B1 | 10/2003 | Arthur et al. |
| 6,640,187 B1 | 10/2003 | Chenault et al. |
| 6,650,252 B2 | 11/2003 | Himmelstein |
| 6,700,493 B1 | 3/2004 | Robinson |
| 6,714,857 B2 | 3/2004 | Kapolka et al. |
| 6,732,032 B1 | 5/2004 | Banet et al. |
| 6,738,697 B2 | 5/2004 | Breed |
| 6,746,153 B2 | 6/2004 | White et al. |
| 6,753,784 B1* | 6/2004 | Sznaider et al. ....... G08B 21/10 340/286.02 |
| 6,791,472 B1 | 9/2004 | Nakayama et al. |
| 6,799,097 B2* | 9/2004 | Villarreal Antelo et al. ............... B61L 25/025 246/76 |
| 6,801,837 B2 | 10/2004 | Carlstedt et al. |
| 6,804,602 B2 | 10/2004 | Impson et al. |
| 6,826,405 B2 | 11/2004 | Doviak et al. |
| 6,885,874 B2 | 4/2005 | Grube et al. |
| 6,919,821 B1 | 7/2005 | Smith |
| 6,938,829 B2 | 9/2005 | Doherty et al. |
| 6,950,013 B2 | 9/2005 | Scaman et al. |
| 6,950,022 B2 | 9/2005 | Breed |
| 6,952,181 B2 | 10/2005 | Karr et al. |
| 6,977,597 B2 | 12/2005 | Doherty |
| 6,981,047 B2 | 12/2005 | Hanson et al. |
| 6,988,033 B1 | 1/2006 | Lowry et al. |
| 7,027,915 B2 | 4/2006 | Craine |
| 7,064,657 B2 | 6/2006 | Becker et al. |
| 7,084,775 B1 | 8/2006 | Smith |
| 7,085,382 B2 | 8/2006 | Terao et al. |
| 7,117,075 B1 | 10/2006 | Larschan et al. |
| 7,138,916 B2 | 11/2006 | Schwartz et al. |
| 7,164,365 B2 | 1/2007 | Doherty et al. |
| 7,248,159 B2 | 7/2007 | Smith |
| 7,268,703 B1 | 9/2007 | Kabel et al. |
| 7,355,509 B2 | 4/2008 | Rennie et al. |
| 7,386,392 B1 | 6/2008 | Kabel et al. |
| 7,392,117 B1* | 6/2008 | Bilodeau et al. ..... B61L 23/042 246/120 |
| 7,400,267 B1 | 7/2008 | Doherty et al. |
| 7,421,334 B2 | 9/2008 | Dahlgren et al. |
| 7,647,142 B2* | 1/2010 | Desanzo ................. B61L 23/04 701/20 |
| 7,922,127 B2* | 4/2011 | Kumar et al. ...... B61L 27/0027 246/28 R |
| 8,275,522 B1* | 9/2012 | Groeneweg et al. .. G06Q 10/06 701/50 |
| 8,452,467 B2* | 5/2013 | Kumar ................. B61L 25/025 246/185 |
| 8,645,047 B2* | 2/2014 | Daum et al. .......... B61L 3/006 701/1 |
| 8,944,677 B2* | 2/2015 | Agostini ................. B61K 9/06 374/120 |
| 9,423,305 B2* | 8/2016 | Agostini ................. B61K 9/06 |
| 9,664,567 B2* | 5/2017 | Sivathanu ............. G01J 5/0003 |
| 2001/0045891 A1 | 11/2001 | Nakao et al. |
| 2002/0122394 A1 | 9/2002 | Whitmore et al. |
| 2002/0193938 A1 | 12/2002 | DeKock et al. |
| 2003/0055666 A1* | 3/2003 | Roddy et al. ....... B61L 27/0094 705/305 |
| 2003/0058216 A1 | 3/2003 | Lacroix et al. |
| 2003/0125073 A1 | 7/2003 | Tsai et al. |
| 2003/0236598 A1* | 12/2003 | Villarreal Antelo et al. ............... B61L 25/025 701/19 |
| 2004/0138790 A1 | 6/2004 | Sloman |
| 2004/0170181 A1 | 9/2004 | Bogdon et al. |
| 2004/0195357 A1 | 10/2004 | Doherty et al. |
| 2004/0203436 A1 | 10/2004 | Oesterling |
| 2004/0224668 A1 | 11/2004 | Shell et al. |
| 2004/0264402 A9 | 12/2004 | Whitmore et al. |
| 2005/0002419 A1 | 1/2005 | Doviak et al. |
| 2005/0020308 A1 | 1/2005 | Lai |
| 2005/0043019 A1 | 2/2005 | Nakamura et al. |
| 2005/0066033 A1 | 3/2005 | Cheston et al. |
| 2005/0192725 A1 | 9/2005 | Li |
| 2005/0198257 A1 | 9/2005 | Gupta et al. |
| 2005/0203683 A1 | 9/2005 | Olsen et al. |
| 2005/0223114 A1 | 10/2005 | Hanson et al. |
| 2005/0223115 A1 | 10/2005 | Hanson et al. |
| 2005/0243857 A1 | 11/2005 | Hofstaedter et al. |
| 2005/0246088 A1 | 11/2005 | Doherty et al. |
| 2006/0009213 A1 | 1/2006 | Sturniolo et al. |
| 2006/0020375 A1* | 1/2006 | Harrison ............... B61L 23/044 701/20 |
| 2006/0022846 A1 | 2/2006 | Tummala |
| 2006/0023676 A1 | 2/2006 | Whitmore et al. |
| 2006/0046716 A1 | 3/2006 | Hofstaedter |
| 2007/0219682 A1* | 9/2007 | Kumar et al. .......... B61L 3/006 701/19 |
| 2007/0265780 A1 | 11/2007 | Kesler et al. |
| 2007/0296574 A1 | 12/2007 | Smith et al. |
| 2008/0033605 A1* | 2/2008 | Daum et al. ............ B61L 3/006 701/19 |
| 2008/0157943 A1 | 7/2008 | Rennie et al. |
| 2008/0251614 A1 | 10/2008 | Doherty et al. |
| 2009/0132179 A1* | 5/2009 | Fu et al. ................. G01K 13/06 702/34 |
| 2010/0026551 A1* | 2/2010 | Szwilski et al. ......... B61K 9/08 342/22 |
| 2010/0182163 A1* | 7/2010 | Rennie et al. ......... G08G 1/017 340/905 |
| 2010/0204857 A1* | 8/2010 | Forrest et al. ...... B61L 27/0094 701/19 |
| 2014/0044146 A1* | 2/2014 | Harrison ................ G01N 25/72 374/4 |
| 2017/0029001 A1* | 2/2017 | Berggren ................ B61K 9/08 |

FOREIGN PATENT DOCUMENTS

| | | |
|---|---|---|
| CA | 2272541 | 5/1998 |
| CH | 516050 | 11/1971 |
| DE | 3506229 | 8/1986 |
| DE | 3712452 | 11/1988 |
| FR | 2229812 | 12/1974 |
| FR | 2378132 | 8/1978 |
| FR | 2618543 | 1/1989 |

OTHER PUBLICATIONS

"Maintenance Decision Support System—King of Prussia, PA—MDSS Showcase Agenda", Aug. 27, 2008, available at http://www.pdshowcase.org/home/showcase/13.

"Software | Intelligent Snow Plow" available at http://www.intelligentdevicesinc.com/snow_plow.html, 2008, 1 page.

"Intelligent Snow Plow" Intelligent Devices, available at http://www.intelligentdevicesinc.com/pdf/software/intelligent_snow_plow.pdf, date unknown, pp. 1-2.

"Maintenance Decision Support System—Boise, ID—MDSS Showcase Agenda", Sep. 17, 2008, available at http://www.pdshowcase.org/home/showcase/14,.

(56) References Cited

OTHER PUBLICATIONS

"Maintenance Decision Support System—Omaha, Nebraska", May 28, 2008, available at http://www.pdshowcase.org/home/showcase/10.
Huft "Status of the MDSS Pooled Fund", available at http://www.ral.ucar.edu/projects/rdwx_mdds/meetings/MDSS_stakeholder_9.2007/MD_session2_huft.pdf, Sep. 18, 2007, pp. 1-12.
Huft "Pooled Fund Study (PFS) Maintenance Decision Support System Pooled" available at http://www.ral.ucar.edu/projects/rdwx_mdss/meetings/MDSS_stakeholder_8.2008/MD_2.2_Huft_MDSS_Pooled_Fund_Study_Update.pdf, Aug. 6, 2008, pp. 1-24.
"Maintenance Decision Support System (MDSS)", available at http://www.utahltap.org/Services/Workshops/productdemoshowcase/MDSS/registration/agendaMDSS.pdf, May 28, 2008, pp. 1-3.
Huft "Development & Deployment of NCTIP-Compliant Mobile Maintenance Data Collection" available at http://www.nritsconference.org/downloads/Presentations07/B1Huft.pdf, Oct. 2007, pp. 1-12.
"Better bridge deicing on the way?" Better Roads, Jun. 1995, 1 page.
"Cellular technology has new niche, Phones offer mobile control in rural Colorado," by Dinah Zeiger, Denver Post, Aug. 21, 1994, 2 pages.
"Concept Highway Maintenance Vehicle, Final Report: Phase One," Apr. 1997, CTRE, pp. 1-92.
"Developments Improve Road Weather Information Systems," Betters Roads, pp. 21 and 24 available, Oct. 1995.
"GIS: The World's ITS Backbone", Case Study, Environmental Systems Research Institute, Inc. 4 pages, 1997.
"Innovations in ITS," ITE Journal, Dec. 1996, 3 pages.
"ITS applications for magnetic tape",ITS; Intelligent transport systems, Jan./Feb. 1997, 1 page.
"Magnetic strips make snow ploughs smarter", ITS: Intelligent transport systems, Jan./Feb. 1997.
"Maintenance Management and Winter Operations," Transporation Research Record No. 1533, Transportation Research Board, 1996, 7 pages.
"Maintenance Management, Traffic Safety, and Snow Removal," Transportation Research Record No. 1352, Transportation Research Board, 1992, 92 pages.
"McCaw's AirData Network Gets Wheels; Showcases First CDPD-enabled Mobile Office Van from the Streets of Las Vegas at COMDEX/Fall '94", Business Wire, Nov. 14, 1994, pp. 1-2.
"Measuring Salt's Effectiveness in New York," Better Roads, Jan. 1995, 1 page.
"Our Mission: Traveler Services; 100% accurate, anywhere, anytime," VDOT Mar. 3, 2006, 16 pages.
"OutFront—What's Happening in the World of ITS—Study Predicts $400 billion market for ITS over the next 20 years" date unknown, 1 page.
"Phase Two Concept Highway Maintenance Vehicle Work Plan", Appendix G, Prepared by the Center for Transportation Research and Education, Ames, IA, Oct. 1996, 10 pages.
"Riding the Data Highway," Newsweek, p. 97, Mar. 21, 1994.
"Roads Report," edited by Larry Flynn, Roads & Bridges, Mar. 1993. 1 page.
"Rockwell rolls out DataTrax/GPS onboard computer with built-in GPS. (Rockwell Transportation Electronics; Global Positioning System)," Satellite News, Nov. 6, 1995, pp. 1-2.
"RWIS helps snow and ice control," Better Roads, Sep. 1994, 1 page.
"Snow and Ice Control: A Best Practices Review," May 1995, Office of the Legislative Auditor State of Minnesota, pp. 1-148.
"Snow Plowing goes high Tech," CTRE, Aug. 1997, pp. 1-16.
"Snow Removal and Ice Control Technology," Transportation Research Board, Conference Proceedings 16, 1996 pp. 1-174.
Southeast Michigan Snow and Ice Management (SEMSIM), Final Evaluation at End of Winter Season Year 2004, Aug. 1, 2004, 90 pages.

"Technology Transfer—NHI Reinforces Its Partnerships with industry", Nov. 1996 Transporter, http://www.tfhrc.gov/trnsptr/rttnov96/rd961109.htm, accessed Nov. 2, 2009 2 pages.
"The Wisconsin DOT used an ice detection system and a snow forecasting model to aid in the dispatch of snow plows and deicers saving 4 hours per person for each significant storm (a value of around $144,000/storm), and approximately $75,000 in salt," RITA: Intelligent Transportation Systems, Mar./Apr. 1990, abstract only, 1 page.
"Traffic Sensor System," Better Roads, Dec. 1995, p. 15.
"UK proposes three private traffic control centres", ITS: Intelligent transport systems, Jan./Feb. 1997, 1 page.
"Water, Pure and Simple," Discover, pp. 87-88, Jul, 1996.
"Wetlands and road construction: Like Oil and Water?" Technology News, Aug.-Sep. 1997, pp. 1-12.
"What is a Road Weather Information System (RWIS)?" Road Weather Management Program, printed Oct. 30, 2009, 2 pages.
"Winter Maintenance for the New Millennium," U.S. Department of Transportation, Federal Highway Administration, Oct. 1998, pp. 1-4.
"Winter Maintenance Technology and Practices—Learning from Abroad," Research Results Digest, No. 204, Jan. 1995, NCHRP, pp. 1-16.
"Winter Maintenance Technology and Practices—Learning from Abroad," Road Management & Engineering Journal, Mar. 1, 1997, TranSafety. Inc., pp. 1-9.
1997 APWA North American Snow Conference, Apr. 27-30, 1997, Kansas City, Missouri, pp. 1-22.
Advertisement, "Are You Still Detecting Icy Roads Between Pavement Sensors by the Seat of Your Pants?" Vaisala, date uknown, 1 page.
Appendix A, Literature Search, date uknown, pp. 1-29.
Appendix B, Identify List of Desired Vehicle Capabilities, date unknown, 12 pages.
Appendix C, Research Funding Sources, 1996, 4 pages.
Appendix C: Motor Carrier Case Study, Evaluation Report vol. II—Case Study Field Notes by Western Highway Institute, ATA Foundation, Feb. 1994, pp. 1-108.
Appendix D, Select Private Sector Partners, 1996, 19 pages.
Appendix E, Develop Description of Systems, 1996, 6 pages.
Axelson, "Winter Road Maintenance System," Pennsylvania Department of Transportation, Maintenance Management, Conference Proceedings 5, Transportation Research Board, 1995, pp. 63-65.
Banasiak, "Snowfighters gather in Salt Lake City," Roads & Bridges, Jun. 1996, pp. 1-2.
Boselly et al., "Road Weather Information Systems vol. I: Research Report," Strategic Highway Research Program, Sep. 1993, pp. 1-219.
Boselly et al., "Road Weather Information Systems vol. II: Implementation Guide," Strategic Highway Research Program, Sep. 1993, pp. 1-82.
Boselly, "Benefit-Cost Assessment of the Utility of Road Weather Information Systems for Snow and Ice Control," Transportation Research Record 1352, pp. 75-82 , date unknown.
Boselly, "Road Weather Information Systems: What are they and what can they do for you?" Transportation Research Record 1387, pp. 191-195, date unknown.
Bowman, Supplemental Advance Warning Devices: A Synthesis of Highway Practice, NCHRP Synthesis of Highway Practice, Issue No. 186, 1993, 92 pages.
Boynton "The View From Space Satellites keep eye on earthly activity", USA Today, date unknown, 2 pages.
Brochure, "Artificial Intelligence/Expert Systems," Kaman Sciences Corporation, Copyright 1991, 2 pages.
Brochure, "Better Roads . . . Safer Roads . . . More Cost Effective Roads . . . Through Innovations in Technology," Federal Highway Administration, date uknown, 4 pages.
Brochure, "Facts About Southwest Research Institute," Southwest Research Institute, San Antonio, Texas. Annual Report from Southwest Research Institute, 1996, 2 pages.
Brochure, "KEMS . . . A Geographic Information System Tailored for Emergency Management Applications," Kaman Sciences Cor-

(56) References Cited

OTHER PUBLICATIONS poration. Article, "Measuring Salt's Effectiveness in New York," Better Roads, Jan. 1995., 4 pages.
Brochure, "Solving Today's Problems for Tomorrow's Safety," Control Products, Inc., date unknown, 2 pages.
Brochure, Enator Telub AB, "Mobile Road Condition Monitoring," Appears to be available as early as 1998.
Brochure, Southwest Research Institute—Guide, 8 pages, Aug. 1996.
Brochure, Southwest Research Institute—Guide, 8 pages, Jan. 1998.
Brown et al., "A Technical Report to the Secretary of Transportation on a National Approach to Augmented GPS Services," Dec. 1994, pp. 1-177.
Chapter 4: Introduction to Technologies, pp. 33-40, date unknown.
Chapter 8: Winter Operations and Salt, Sand, and Chemical Management, date unknown pp. 1-68.
Chapter 9: Temperature Sensors, date unknown, pp. 1-3.
Chollar, "Revolution in Winter Maintenance," U.S. Department of Transportation, Federal Highway Administration, Winter 1996, vol. 59, No. 3, 3 pages.
Clarus initiative, Read Ahead Package for Clarus Initiative Coordinating Committee Meeting #4, Aug. 8-9, 2006, Falls Church, VA, pp. 1-33.
Concept Paper, Northern Virginia Transportation Management Program: Enhancements for Incident Response and Emergency Operations Command/Control and Information Sharing, Jan. 25, 2001, 4 pages.
Crosby "Visibility a Key Component of Weather Systems,", Feedback on article, "Managing Winter Weather", Dec. 1996, 1 page.
Cumberledge et al., "Integration of Management Systems for Maintenance Activities," Pennsylvania Department of Transportation, Maintenance Management, Conference Proceedings 5, Transportation Research Board, 1995, pp. 26-30.
Dawley et al., "Ergonomic Factors in a one-person operation of snow plows with attached wing plows," Presentations from the 10th Equipment Management Workshop, Portland, OR, 1994, pp. 37-41.
Draft Proposal, Policy Recommendations to the RAQC Concerning the Comprehensive Long Range Air Quality Plan, from the Street Sanding/Cleaning Subcommittee City of Aurora Public Works Dept. (Colorado), Nov. 1, 1995, 2 pages.
Environmental Monitoring System (EMS), IPS MeteoStar, printed Oct. 30, 2009, 4 pages.
Excerpts from America Online: KKlean, Jun. 30, 1995, 6 pages.
Flanagan, "The Virtual Consolidated Operations Center," pp. 1-20, 1995.
Fleege "Equipment in Scandinavian Countries", Presentations from the 10th Equipment Management Workshop, Portland, OR, 1994, pp. 105-108.
Fleege et al., "Spreader Equipment for Anti-Icing", Maintenance Management and Safety, Transportation Research Record No. 1509, Transportation Research National Research Council, 1995, pp. 22-27.
GL 400 Spreader Control Presentation, Component Technology, Oct. 25, 1997, 12 pages.
Goodwin, "Best Practices for Road Weather Management," May 2003, pp. 1-131.
Hanbali et al., "Traffic vol. Reductions due to Winter Storm Conditions," Transportation Research Record 1387, 1993, pp. 159-164.
Highway Capacity Manual, Chapter 22: Freeway Facilities, 2000, 68 pages.
Hudson, "Let it Snow, let it snow, let it snow: 11 ways to maintain winter roads," http://americancityandcounty.com/mag/government_let_snow_let/, Apr. 1, 1996.
Hunter "1994 Midwestern States Equipment Management Conference" Presentations from the 10th Equipment Management Workshop, Portland, OR, 1994, pp. 111-113.
Hunter, "Snow Plow Trucks—Specifications for the Twenty-First Century," Presentations from the 10th Equipment Management Workshop, Portland, OR, 1994, pp. 31-35.

Hyman et al., "Field Testing and Evaluation of Innovative Technologies for Maintenance Data Collection," Transportation Research Board Conference Proceedings, 1995, No. 5, pp. 9-17.
ITIB Major IT Project Status Report for Jan. 2009—Summary, 9 pages.
Kuemmel "Managing Roadway Snow and Ice Control Operations," NCHRP Synthesis of Highway Practice, Issue No. 207, National Cooperative Highway Research Program, pp. 1-66, 1994.
Lasky et al., "Automated Highway Systems (AHS) Classification by Vehicle and Infrastructure," Advanced Highway Maintenance & Construction Technology Research Center, Jan. 25, 1994, 65 pages.
Manfredi et al., "Road Weather Information System Environmental Sensor Station Siting Guidelines," Report No. FHWA-HOP-05-026, Federal Highway Administration, Apr. 2005, U.S. Department of Transportation, 52 pages.
Manfredi et al., "Road Weather information System Environmental Sensor Station Siting Guidelines," Version 2.0, Nov. 2008, U.S. Department of Transportation, 71 pages.
Marketing Document, Didactics corporated, "IR Applications for Ice and Snow Control," 1998, 29 pages.
Markow et al., "Highway Maintenance and Integrated Management Systems, " Transportation Research Board Conference Proceedings, 1995, No. 5, pp. 31-37.
Montagne et al., "Oregon Green Light CVO Evaluation, Final Report, Detailed Test Plans 2 and 3, Evaluation of the Road Weather Information System (RWIS)" Jun. 2000, 89 pages.
Nixon "Foreign Technology Applications for the Winter Maintenance Concept Vehicle," Iowa Institute of Hydraulic Research, 1996, Appendix F, Foreign Technology Applications Report, 16 pages.
On-Site Weather, Weather or Not, date unknown, 1 page.
Pell, "An Improved Displacement Snowplow," Strategic Highway Research Program, May 1994, pp. 1-93.
Peterson, "Snow Plow Truck Cab Ergonomics: Summary," Presentations from the 10th Equipment Management Workshop, Portland, OR, 1994, p. 36.
Pilli-Sihvola et al., "Road weather service system in finland and savings in driving costs," Transportation Research Record No. 1387, 1992, pp. 196-200.
Pilli-Sihvola, "Weather-Related Traffic Management in the E18 Finnish Test Area," Finnish Naitonal Road Administration, pp. 1-4.
Pisano et al, "Intelligent Transportation Systems and Winter Operations in Japan," Sep. 2003, pp. 1-7.
Press releases and product launches 2009, Vaisala to launch Road Weather Decision Support Sytem technologies, Jul. 9, 2009, 1 page.
Rasmussen, Erik; "Mobile Doppler Radar: A new tool to investigate tornadic storms"; NSSL Briefings; Fall/Winter 1995; pp. 10-11.
Reiter et al., "Artificial Intelligence-supported weather prediction for highway operations," Strategic Highway Research Program, 1992, p. 49, Abstract only.
Reiter et al., "Detailed weather prediction system for snow and ice control," Transportation Research Board, 1387, 1993, pp. 223-230.
Report on the 1998 Scanning Review of European Winter Service Technology, National Cooperative Highway Research Program, Research Results Digest, Apr. 1999, No. 238, 34 pages.
Road Condition-Weather Monitor: System to Determine Pavement Surface and Atmospheric Conditions, North Dakota DOT, 1 page, Sep. 1997.
Roosevelt et al., "Automatic vehicle location system in urban winter maintenance operations," Transportation Research Record 1741, Paper No. S00-0044, pp. 1-5, date unknown.
Roosevelt et al., "Final Report: Lessons Learned from a Pilot Project of an Automatic Vehicle Location System in an Urban Winter Maintenance Operations Setting," Virginia Transportation Research Council, Apr. 2002, pp. 1-17.
SAIL 2 Evaluation, Mn/DOT Contract No. 86353, Jan. 2007, 50 pages.
Scan FP 2000 Sensor Advertisement, Surface Systems Inc., date unknown, 2 pages.
Scapinakis et al., "Communications and Positioning Systems in the Motor Carrier Industry," Program on Advanced Technology for the Highway Institute of Transportation Studies University of California at Berkeley, PATH Research Report, pp. 1-82 , date unknown.

(56) References Cited

OTHER PUBLICATIONS

Smith, "A new paradigm for winter maintenance decisions," 1998 Transportation Conference Proceedings, pp. 1-4.
Smith, "From Concept to Reality: Advanced Technology and the Highway Maintenance Vehicle," Presentations from the 12th Equipment Management Workshop, 1998, pp. 4-14.
Smithson, "AASHTO's Winter Maintenance Program: A Proactive Approach to International Technology Transfer," Iowa Department of Transportation, pp. 15-21, date unknown.
Smithson, "Americans can Learn a Lot from European, Japanese Snowfighters," Roads & Bridges, pp. 30-32 available, Jun. 1995.
Smithson, "DOTs push for better snow control vehicles," Better Roads, Jun. 1997, pp. 27-29.
Smithson, "Japanese and European Winter Maintenance Technology", Pennsylvania Department of Transportation, Maintenance Management, Conference Proceedings 5, Transportation Research Board, 1995, pp. 66-68.
Snow Removal and Ice Control Technology: selected papers presented at the Fourth International Symposium, Reno, Nevada, Aug. 11-16, 1996, Transportation and Research Board, published 1997, ps. 1-174.
Snowbreak Forest Book—Highway Snowstorm Countermeasure Manual, FHWA-PL-97-010, Japanese Original Printed Mar. 1990, Translated from Japanese, 1996, 107 pages.
Stern et al., "Vehicles as Mobile Sensing Platforms for Critical Weather Data," Briefing for the VII Weather Applications Workshop #1, Feb. 22, 2006, National Center for Atmospheric Research, Boulder, CO, pp. 1-35.
Surface Patrol™, available at http://www.ae-traffic.com/Surface_Patrol.html, printed Oct. 30, 2009, pp. 1-3.
Takeuchi et al., "Variation in motorist visual range measured by vehicle-mounted sensor," Transportation Research Record, 1387, 1993, pp. 173-177.
Task 9 Automatic Vehicle Locating System,(AVL) Pilot Program for Snow Removal Operations, End of Program Report, Final, May 10, 2000, 17 pages.
The Intelligent Vehicle, May 1997, 1 page, printed Feb. 5, 2010.
Third International Symposium on Snow Removal and Ice Control Technology, Minneapolis, Minnesota, Sep. 14-18, 1992. Preprints: vol. 1 and vol. 2, Abstract only.
Thornes, "Cost-Effective Snow and Ice Control for the 1990s," Snow Removal and ice Control Technology, Transportation Research Record No. 1387, 1993, 7 pages.
Vaisala Guardian, "Road Weather Information Systems,", printed Oct. 30, 2009, 1 page.
Vaisala Guardian, The most effective and affordable road weather information system for cities, towns and counties, printed Oct. 30, 2009, 3 pages.
Vaisala U.S. National Lightning Detection Network, printed Oct. 30, 2009, 1 page.
VDOT VOIS/Weather information Processing and Distribution (Inventory Element), Virginia.gov, printed Oct. 30, 2009, 4 pages.
Viking '79 Rover Study Final Report, vol. I, Summary, vol. II, Detailed Technical Volume, NASA CR-132417, Martin Marietta Corporation, Mar. 1974, 4 pages.
Zeyher, "Just Drive!," Roads & Bridges, Apr, 2002, 3 pages.
"µWEBox Lite GSM/GPRS (GPS)—Revision 1.2", Comtech M2M, date unknown, pp. 1-60.
"µWEBox Lite Product FAmily", Comtech M2M, 2004, pp. 1-60.
"BlueTree Wireless Data—Wireless Modems", printed Jan. 4, 2007, pp. 1-4.
"GPRS GPS modem GPS GPRS modems—Comtech M2M", available at http://www.comtechm2m.com/gprs-modem/gprs-gps-modem.htm, printed Jan. 4, 2007, pp. 1-4.
"GPS information", available at http://www.alltrackusa.com/gps_info.html, printed Jan. 4, 2007.
"GPS Tracking, GPS Vehicle Tracking products for monitoring of teen drivers", available at http://www.alltrackusa.com/, printed Jan. 4, 2007, pp. 1-4.

"Gps Wireless Modem—KnowledgeStorm Wireless Results for Gps Wireless Modem", printed Jan. 4, 2007, pp. 1-5.
"GPS-150 Automatic Vehicle Location Unit", CES Wireless Technologies Brochure, Jan. 9, 2003, 11 pages.
"Sierra offers GPS wireless modem", Globe Technolgy.com, Sep. 9, 2003, 1 page.
"TransCore Set to Develop DSRC, GPS, and Satellite Combined Communications Modem; Move Will Merge Disparate Telematics Technologies into One Device for In-Vehicle Safety Applications", Business Wire, Nov. 7, 2005, pp. 1-4.
"Ulster County Sheriff Media Release", dated Nov. 17, 2006, pp. 1-8.
"Using GPS for Vehicle Tracking, Asset Tracking and Fleet Management", available at http://www.cjseymour.plus.com/gps/gps.htm, dated Mar. 22, 2006, pp. 1-11.
"Vehicle Tracking Technology", available at http://www.trackmyvehicle.com/locate_technology.asp, printed Jan. 4, 2007, 2 pages.
Automatic Vehicle Locator System, date unknown, 1 page.
Campbell: Susan J., "TotalRoam Proves Successful Enough for Expansion in Three Organizations," Available at http://www.tmcnet.com/news/2006/02/14//11371250.htm, Feb. 14, 2006, 7 pages.
Dahlgren, LLC,2004, available at http://www.dahlgrenllc.com/AboutUs.htm, accessed Jun. 10, 2009, 1 page.
Declaration of Kevin K. Groeneweg Under 37 CFR Section 1.98 (15 pgs.),including Exhibits A (10 pgs.), and B (1 pg.).
Falkenberg et al., "Precise Real-Time Kinematic Differential GPS Using a Cellular Radio Modem", Nov Atel Communications Ltd., presented at the IEEE Position Location an dNavigation Symposium PLANS 92, Monterey, CA, Mar. 24-27m 1992, 13 pages.
Junxion, Inc., "Field Commander junxion box remote management", Junxion, Inc., Seattle WA, 2005-2006, 1 page.
Junxion, Inc., "Junxion Box: User Guide", Model JB-110b (Wi-Fi and Ethernet LAN), Firmware Version 1.3, User Guide Revision B. Junxion, Inc., Seattle WA, 2004-2005, 48 pages.
Junxion, Inc., "Junxion Box, User Guide", Model JB-110e (Ethernet LAN only), Firmware Version 1.3, User Guide Revision A, Junxion, Inc., Seattle WA, 2004-2005, 44 pages.
Junxion, Inc., "Junxion Box; device durability testing", Junxion, Inc., Seattle WA, 2005-2006, 1 page.
Junxion, Inc.,"Junxion Box; wireless WAN router", Junxion, Inc., Seatlle WA, 2004-2006, 2 pages.
Junxion, Inc., "Junxion Complete; turn-key WWAN solutions", Junxion, Inc., Seattle WA, 2005-2006, 1 page.
Junxion, Inc., "Why Junxion? five reasons to consider" , Junxian, Inc., Seattle WA, 2005-2006,1 page.
Manpage of PPP, "PPPD", Available at http://iie.fing.edu.uy/ense/redatos/links/lab4/pppd.html, Aug. 3, 2005, 24 pages.
Mobile Competency, "Total Roam; The Business Case for Connection Persistence in Enterprise Wireless", White Paper prepared for Padcom, Mobile Competency Inc., Providence RI, 2005, 4 pages.
NetMotion Wireless Inc., "Best Practices for Wireless CRM", NetMotion. Wireless Inc., Seattle WA, 2004, 5 pages.
NetMotion Wireless Inc., "Mobiity XE; Get Connected, Stay Connected.", NetMotion Wireless Inc., Seattle WA, 2005, 6 pages.
NetMotion Wireless Inc., "Mobility XE Compatibility Guide", Available at http://www.netmotionwireless.com/resources/compatibility.asp, 2005, 2 pages.
NetMotion Wireless Inc., "NetMotion Mobility XE and Mobile IP", Available at http://www.netmotionwireless.com/lib/PrintPage.asp?REF=, 2005, 4 pages.
NetMotion Wireless Inc., "NetMotion Mobility XE Link Optimization for Wireless WANs", NetMotion Wireless Inc., Seattle WA, 2005, 5 pages.
NetMotion Wireless Inc., "NetMotion Mobility XE Scalability", NetMotion Wireless Inc., Seattle WA, 2005, 6 pages.
NetMotion Wireless Inc., "Policy Management Module", Available at http://www.netmotionwireless.com/product/info/policy_mgt_sheet.asp, 2005, 3 pages.
NetMotion Wireless Inc., "Technical Overview for Network Administrators", NetMotion Wireless Inc., Seattle WA, 2005, 9 pages.
NetMotion Wireless Inc., "The Key to Mobility", Available at http://www.netmotionwireless.com/products/mobility_keys.asp, 2005, 5 pages.

(56) References Cited

OTHER PUBLICATIONS

NetMotion Wireless Inc., "What's New in Mobility XE", Available at http://www.netmotionwireless.com/product/whatsnew_663.asp, 2005, 10 pages.
NetMotion Wireless Inc.,"Wireless LANs: The Essentials for Saving Your Sanity", NetMotion Wireless Inc., Seattle WA, 2004, 6 pages.
NetMotion Wireless Inc., "Wireless Wide Area Networks: Trends and Issues", NetMotion Wireless Inc., Seattle WA, 2005, 6 pages.
North American Light Rail Terminology, Jun. 7, 2008, available at http://www.lightrail.com/terminology.htm, accessed Dec. 20, 2008, 26 pages.
Ortega et al., "Development of an In-House Automated Vehicle Location System", Proceedings of the 2003 Mid-Continent Transportations Research Symposium, Ames, Iowa, Aug. 2003, 7 pages.
Padcom Inc., "6100 Remote Access Router", Available at http://www.padcomusa.com/remote-access-router-6100.shtml, undated, 1 page.
Padcom Inc., "8100 Remote Access Router", Available at http://www.padcomusa.com/remote-acess-router-8100.shtml, undated, 2 pages.
Padcom Inc., "CDPD to Public Next-Generation Networks: Understanding the Transition" , Padcom Inc., Bethlehem, PA, 2005, 8 pages.
Padcom Inc., "Point of Service Architecture", Available at http://www.padcomsusa.com/rar-architecture-pos.shtml, undated, 1 page.
Padcom Inc., "Products; How TotalRoam Works", Available at http://www.padcomusa.com/products-how-tr-works.shtml, undated, 2 pages.
Padcom Inc., "Products; TotalRoam Connect; Mobile VPN", Available at http://www.padcomusa.com/products-tr-connect.shtml, undated, 3 pages.
Padcom Inc., "Products; TotalRoam Mobile Virtual Network (MVN)", Available at http://www.padcomusa.com/products-totalroam-mvn.shtml, undated, 4 pages.
Padcom Inc., "Remote Access Routers", Available at http://www.padcomusa.com/remote-access-routers.shtml, undated, 1 page.
Padcom Inc., "TotalRoam; Technical Overview", Padcom Inc., Bethlehem, PA, 2005, 42 pages.
Padcom Inc., "Use Case Scenario: POS", Available at http://www.padcomusa.com/rar-scenario-pos.shtml, undated, 1page.
Padcom Inc., "Use Case Scenario: Van", Available at http://www.padcom.com/rar-scenario-van.shtml, undated, 1 page.
Padcom Inc., "Vehicle Area Network Architecture", Available at http://www.padcomusa.com/rar-architecture-van.shtml, undated, 1 page.
Xie et al., "Going beyond automatic vehicle location" Nov. 2004, 10 pages.
Zoom: Driving Transportation Informatics, available at http://www.zoominfosystems.com/, accessed Jun. 10, 2009, 1 page.
PCT Application No. PCT/US07/62751, combined International Search Report and Written Opinion (dated Nov. 8, 2007).
International Search Report for International (PCT) Application No. PCT/US08/88670, dated Mar. 6, 2009.
Written Opinion for International (PCT) Application No. PCT/US08/88670, dated Mar. 6, 2009.
International Report on Patentability for International Application No. PCT/US2007/062751, dated Sep. 2, 2008.
A brief seeking invalidation of U.S. Pat. No. 7355509; U.S. Pat. No. 7714705; U.S. Pat. No. 8120473; U.S. Pat. No. 8284037; and U.S. Pat. No. 8497769 for lack of subject matter eligibility.
A brief opposing invalidation of U.S. Pat. No. 7355509; U.S. Pat. No. 7714705; U.S. Pat. No. 8120473; U.S. Pat. No. 8284037; and U.S. Pat. No. 8497769 for lack of subject matter eligibility.
An opinion invalidating U.S. Pat. No. 7355509; U.S. Pat. No. 7714705; U.S. Pat. No. 8120473; U.S. Pat. No. 8284037; and U.S. Pat. No. 8497769 for lack of subject matter eligibility.
A brief appealing district court's invalidation of U.S. Pat. No. 7355509; U.S. Pat. No. 7714705; U.S. Pat. No. 8120473; U.S. Pat. No. 8284037; and U.S. Pat. No. 8497769 for lack of subject matter eligibility.
A brief opposing appeal of district court's invalidation of U.S. Pat. No. 7355509; U.S. Pat. No. 7714705; U.S. Pat. No. 8120473; U.S. Pat. No. 8284037; and U.S. Pat. No. 8497769 for lack of subject matter eligibility.
Appeal decision affirming district court's invalidation of U.S. Pat. No. 7355509; U.S. Pat. No. 7714705; U.S. Pat. No. 8120473; U.S. Pat. No. 8284037; and U.S. Pat. No. 8497769 for lack of subject matter eligibility.

* cited by examiner

INTEGRATED RAIL EFFICIENCY AND SAFETY SUPPORT SYSTEM

CROSS REFERENCE TO RELATED APPLICATIONS

This application is a continuation of U.S. Ser. No. 14/645,042, filed on Mar. 11, 2015, now U.S. Pat. No. 9,989,426 which is a continuation of U.S. Ser. No. 13/560,829, filed on Jul. 27, 2012, now U.S. Pat. No. 8,979,363 which is a continuation of U.S. Ser. No. 12/347,695, filed on Dec. 31, 2008, now U.S. Pat. No. 8,231,270 and hereby incorporates those applications in their entirety. The present application claims the benefits of U.S. Provisional Application Ser. Nos. 61/018,796, filed Jan. 3, 2008, 61/030,822, filed Feb. 22, 2008, and 61/140,539, filed Dec. 23, 2008, each of which is incorporated herein by this reference in its entirety.

FIELD OF THE INVENTION

The invention relates generally to vehicular data collection/transmission systems and particularly to rail vehicle data collection/transmission systems.

BACKGROUND OF THE INVENTION

Weather related problems, such as rail buckling and derailments, pose a significant problem. In addition to the direct loss of equipment and possible personal injury, there are significant consequential costs to commerce and society in terms of lost use of that line, the need to reroute traffic, delays, etc. The reduction of average speeds even of as little as 1 mph, has been estimated to involve millions of dollars in societal costs.

Extreme temperatures (high or low) and adverse weather (e.g., flooding or extreme cold or snow or ice) can force train services to slow down, or, in some cases, stop and/or reroute. Most methods of monitoring rail temperatures to date have involved equipment affixed to rails in limited, specific, static locations. Such fixed sites typically involve significant spatial gaps, are relatively expensive to deploy, require significant site preparation and infrastructure, and are difficult to install and/or maintain, especially in remote stretches.

SUMMARY OF THE INVENTION

The present invention is directed generally to vehicular data collection/transmission systems and particularly to rail vehicle data collection/transmission systems.

In a first embodiment, a rail vehicle includes a sensor to measure a temperature of a rail in proximity to the rail vehicle. The rail vehicle normally travels on the rail. An example of a sensor is an infrared sensor, though other types of temperature sensors may be employed.

In a second embodiment, a central control system, such as a central control system for a rail network, includes a server to receive, from a number of consists located at different parts of a rail network, rail temperature measurements and use the rail temperature measurements to determine one or more of speed restrictions, consist routes, current of traffic, traffic mode, consist schedules, timetables, number of trains per hour, consist length restrictions, and consist weight restrictions.

In a third embodiment, a method includes the steps of:

(a) determining, based on sensed data received from a mobile sensor, a rail temperature at a selected physical location; and (b) generating, by a processor, a command to adjust one or more of a velocity, acceleration, and route of a train based on the rail temperature.

In a fourth embodiment, a method includes the steps of:

(a) receiving, from a number of different consists and by a server, a number of datasets, each dataset including a rail temperature, a timestamp, and a physical location; and (b) based on the datasets, determining, by the server, one or more of a speed restriction, consist route, current of traffic, traffic mode, consist schedule, timetable, number of trains per hour, consist length restriction, consist type restriction, and consist weight restriction.

The invention can allow temperatures and other track and train information to be collected on a mobile basis along entire rail lines. In one configuration, data from a given train, or consist, is combined with that of other trains, or consists and with current and forecasted weather and other information to better monitor and predict potential problematic stretches of line, provide alerts and recommendations to help improve routing/rerouting, maximize efficiency, and facilitate safety and commerce.

These and other advantages will be apparent from the disclosure of the invention(s) contained herein. For example, the invention can realize significant mile/hour improvements in train speed. While not wishing to be bound, it is believed that the invention can improve train speeds anywhere from 0.25 to 1 mile/hour in overall routing during the year, particularly during summer months. It has been estimated that each mile/hour improvement in train speed translates into a savings of $50 to $100 million/year. The invention can generate, in real-time, maps showing train locations, speeds, and statuses and rail conditions and profiles. This can further improve existing computer-aided dispatch systems providing network-wide visibility and thereby permit railroad operators to manage traffic proactively, thereby maximizing capacity and increasing productivity. The invention can provide rail temperatures and/or weather conditions to dispatchers in a separate display and/or input projected delays and problem areas into automated dispatching systems to permit the system's schedules to be adjusted and/or refined.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic even if performance of the process or operation uses human input, whether material or immaterial, received before performance of the process or operation. Human input is deemed to be material if such input influences how the process or operation will be performed. Human input that consents to the performance of the process or operation is not deemed to be "material".

The term "block" refers to a section of track of defined limits for train movement, the use of which is governed by, for example, rules and/or block signals. Not all sections of track on a main line are considered to be part of a block.

The term "block signal" refers to a signal at an entrance of a block to govern trains entering and using that block.

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the invention is considered to include a tangible storage medium or distribution medium and prior art-recognized equivalents and successor media, in which the software implementations of the present invention are stored.

A "consist" is a train including one or more cars or rail vehicles. A consist and train are synonymous terms.

The terms "determine", "calculate" and "compute," and variations thereof, as used herein, are used interchangeably and include any type of methodology, process, mathematical operation or technique.

The term "home signal" refers to a signal at an entrance of a route or block to govern trains entering and using that route or block.

The term "main line" means trackage in a rail network that is outside of a maintenance yard. For example, main line refers to a principal line or lines of a rail network or railway.

The term "module" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

A "speed restriction" refers to a voluntary or mandatory maximum or minimum speed along a section of track or block. An example of a speed restriction is a restricted speed.

"Train" is a series of connected railroad freight or passenger cars or vehicles pulled or pushed by one or more locomotives or propelled by an on-board motor, such as a light rail vehicle.

"Train state" refers to a condition, function, location, or operation of a train or a component or accessory thereof.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

DETAILED DESCRIPTION

The following exemplary embodiments will generally be discussed in relation to a railway embodiment, and in particular to rail monitoring sensors and equipment. However, in general, the system, methodologies and techniques described herein can be applied to other industries, environments, types of vehicles and sensors. As such, there may be a corresponding change in one or more of the type(s) of data depending on the operational environment and a corresponding change in the type(s) and format of information displayed on the various devices.

In one embodiment, a system for rail temperature prediction modeling and warning, as well as the more general collection of rail and other train and track-related information is provided. The collected information can be monitored dynamically onboard, transferred to central computers, and combined the same with weather information and forecasts. The processed information can be inputted into rail temperature prediction modeling and algorithms, which can generate alerts, recommendations, and commands for central dispatchers, engineers and others.

The System Components

Figure 1A:
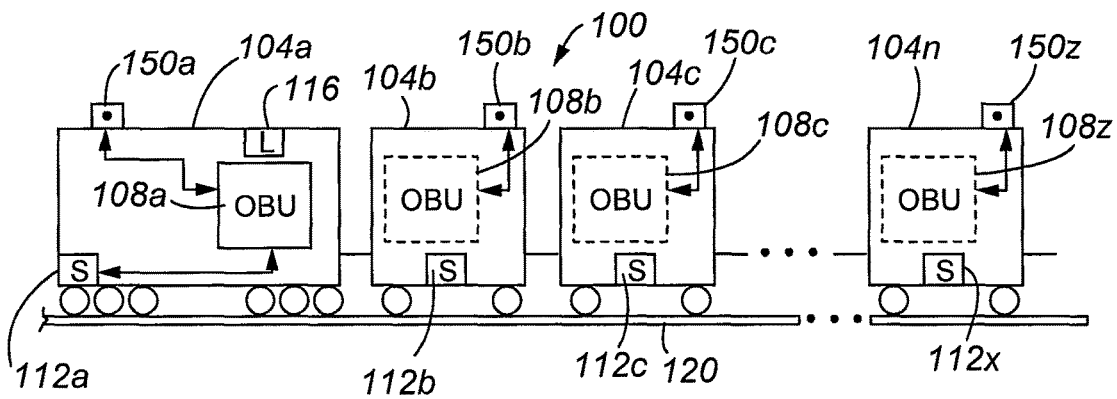
FIG. 1A is a functional block diagram of a train, such as a consist, according to an embodiment.
Figure 1B:
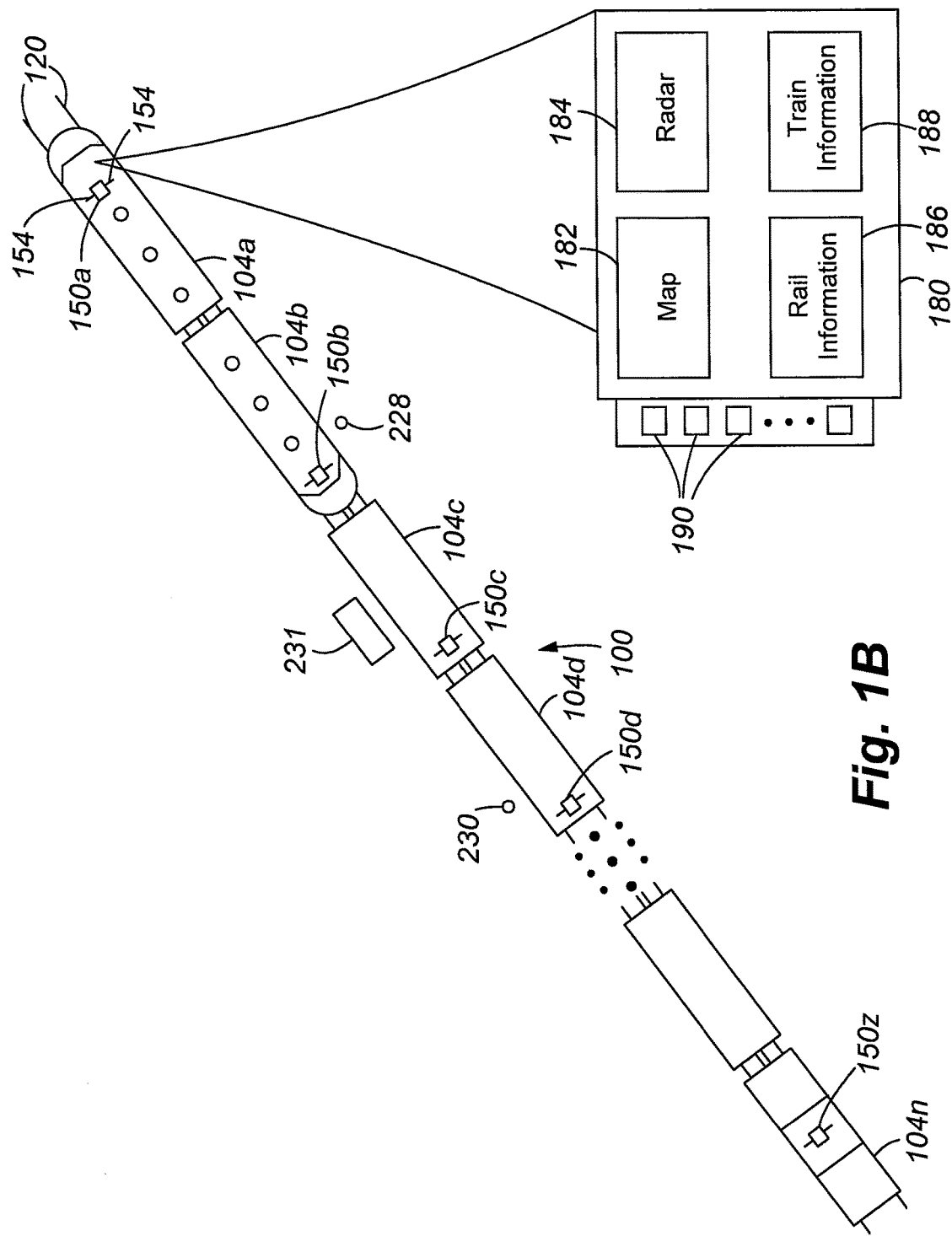
FIG. 1B is a plan diagram of a train according to an embodiment.

With reference to FIGS. 1A and 1B, the information collection and dissemination architecture according to an embodiment includes rail-side units 228, weather pucks or pods 230, stationary equipment 231 (such as a rail-side de-icing sprayer, rail-side sign, rail-side friction enhancer (such as a device that applies sand to the selected section of track), and a train 100. Each train 100 includes a plurality of (motorized or unmotorized) rail vehicles 104*a-n*, one or more of which is equipped with an OnBoard data collection Unit(s) (OBU(s)) 108*a-z*, one or more sensor(s) 112*a-x*, and a spatial location module 116. The OBUs communicate with one another and with remote servers via transceivers 150 and associated antennas 154. The railway vehicles 104*a-n* can be engines, passenger cars, freight cars, and other types of motorized and unmotorized rail vehicles. Although the train 100 is shown as a multi-car consist, it is to be understood that the train can be a single-car consist and can be supported by one or multiple rails 120. For example, the train 100 can be a manually and/or automatically operated passenger train (e.g., a commuter, inter-city, high-speed, or long-distance passenger train) and/or a freight train.

Figure 1C:
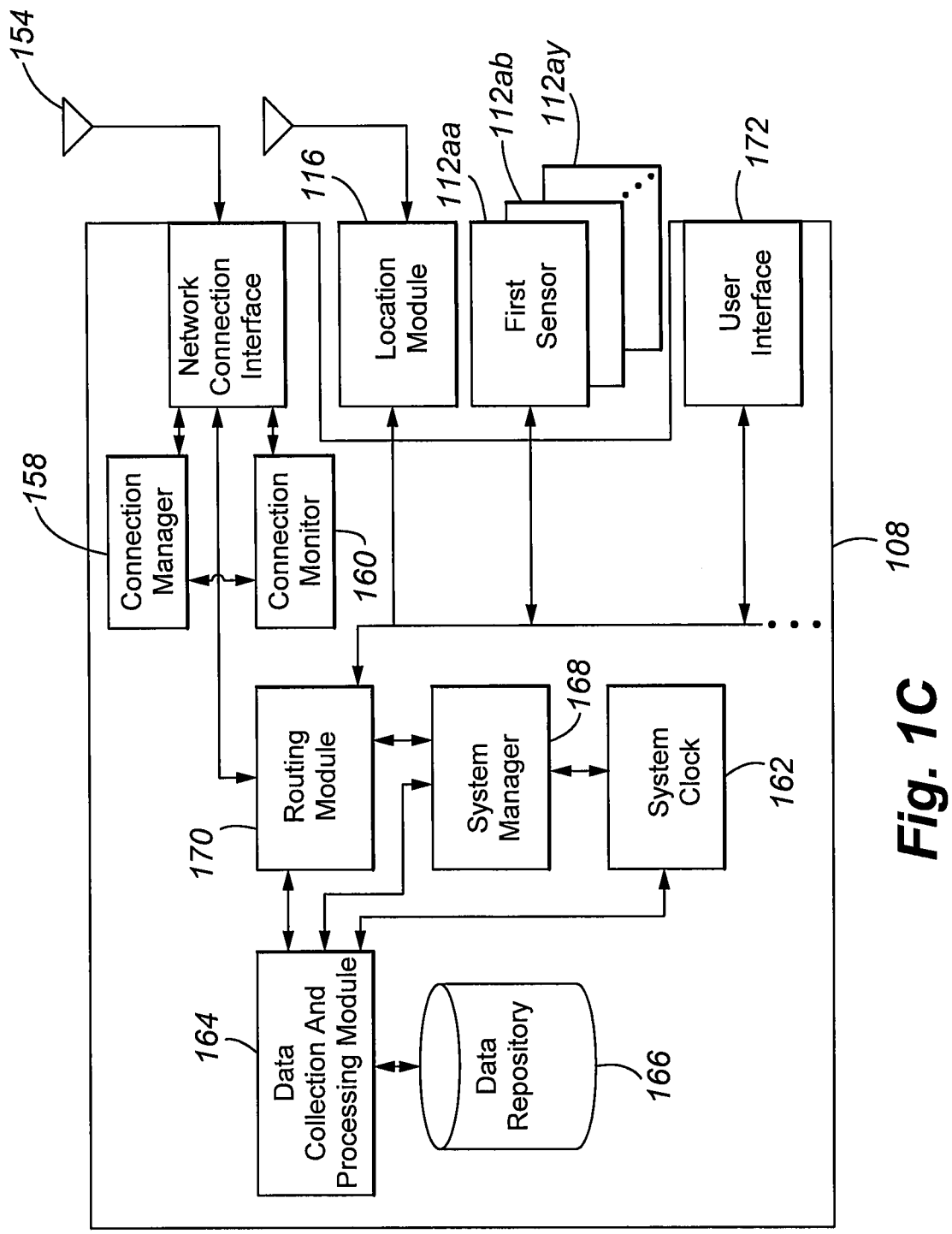
FIG. 1C is a functional block diagram of an on board unit according to an embodiment.

Referring to FIG. 1C, each of the OBUs 108a-z commonly are software-controlled devices having processing capabilities and the ability to transmit data on a wired or wireless basis to other points on the train (if more than one OBU 108 is onboard) and/or to a dislocated central server. More than one OBU 108 can be used per train 100 and more than one OBU 108 on a given train 100 can transmit collected information, or sensed data, to the central server. Each OBU 108 can be capable of monitoring and reporting applicable temperatures, periodically transmitting existing temperatures, transmitting special alerts when parameters are exceeded, receiving commands, recommendations, and other information (such as weather forecast information (e.g., Doppler radar and/or satellite images of weather conditions in the vicinity of the OBU) and expected rail conditions and profiles) from the central servers for presentation, via a user interface (e.g., a voice, graphical, audio, or other type of interface) to train operators. The OBUs may be incorporated into, or interface with, the communication control unit (which controls communications between cars in a consist) and/or electronic control unit (which controls all electronic functions and operations of the train). As will be appreciated, each car in a consist has its own electronic control unit, which communicates with other electronic control units in the consist.

Each OBU 108 includes a number of internal logic modules for performing various operations. The modules are normally implemented in processor executable software but may additionally or alternatively be implemented as logic circuits.

The logic modules include one or more connection managers 158 to configure the OBU as required by the particular communications network provider and interact with the service provider to establish a communication session with the remote server, and one or more connection monitors 160 to monitor the health and/or state of the connection. When the health is unacceptable (e.g., the connection has too much interference or the Quality of Service is unacceptable) or the link used by the connection is down, the monitor 160 causes the manager 158 to reestablish the communication session by setting up another connection. Typically, a set formed by one connection manager and monitor corresponds to each wireless network service provider.

A system clock 162 is synchronized to a universal time clock and provides internal timing information to control OBU operations and timestamp collected data.

A data collection and processing module 164 receives sensed data and other information from the on board sensors 112, location module 116, weather pods 230 and stations, and third party sources, processes the sensed data and other information to form processed information derived from the collected data, and stores the raw and processed information in a data repository 166. The raw and processed information is then transmitted, over an established network connection, to and stored on a remote central server. The data repository 166 is used during normal processing operations and as a buffer for data collected when the network connection is either unhealthy or down.

A routing module 170 identifies the types of digital incoming signals (e.g., by sensor type), based on the type of incoming signal, translates the digital signals received from the sensors to a selected language or format, and directs the communications to the data collection and processing module; directs incoming communications from other OBUs or third parties (such as the central server) to the data collection and processing module 164 or system manager 168, as appropriate; handles outgoing communications such as by packetizing the collected data (with a data-type identifier included in the payload) and applying headers to packets for uploading onto the network; and otherwise handles mail and messaging functions.

A user interface 172 provides information to and receives input from the engineers.

A system manager 168 oversees and controls overall operations of the OBU 108, responds to alarms, interrupts, and other alerts received from the data collection and processing module 164, generates internal commands to control OBU operations, responds to external commands received from remote servers, and performs remote system maintenance and troubleshooting functions, and other functions.

The OBU further includes drivers and programming for the user interface 172.

In one configuration, the data collection and processing module 164 processes multimedia information. For example, the module 164 uses the following parameters to process video information: a URI address of the remote server, an imaging device name, a time interval between snapshots, a Boolean value for whether images should have a current date/time stamp, a Boolean value for whether attachments should be sent as DIME or MIME attachments, a temporary file storage location, and an identifier of the OBU sending the video information.

Each OBU and/or train has a unique identifier. The identifier of the OBU is used, by the data collection and processing module, to associate the received information with a corresponding rail vehicle and respective local host OBU. The data collection and processing module in the local master OBU receives the received information from each OBU on the train. The identifier of the train or master OBU identifier is used by the remote data processing network to associate received information with a set or collection of OBUs.

The train 100 includes one or more location sensor(s) 116. The location sensor(s) 116 can determine location by any type of mechanism, such as by a Global Navigation Satellite System (GNSS) or other satellite navigation system (that provides autonomous geo-spatial positioning with global coverage), Radio Frequency Identification Detection (RFID) (with an RFID reader and tag being used to determine device location), and Internet connectivity via a connection, such as a wi-fi hot spot, controlled by a resource provider. As will be appreciated, GNSS allows small electronic receivers to determine their location (longitude, latitude, and altitude) to within a few meters using time signals transmitted along a line of sight by radio from satellites. Exemplary GNSS include the NAVSTAR Global Positioning System (GPS), the Russian GLONASS, the European Union's Galileo positioning system, the Chinese regional Beidou navigation system, and India's IRNSS. Typically, the location module forwards digital location signals (e.g., GPRMC NMEA sentences) to the respective OBU 108. The timing of the signals is typically controlled by the location module 116. A preferred location module 116 integrates the antenna and a GPS module into a puck positioned on the exterior of the train. The location module 116 can be plugged into various available ports on the OBU, including specially created ports such as a special five-pin DIN connection. The location module can also be separated from the antenna and collocated inside of the OBU.

One or more of the OBUs could be configured with a user interface 172 and/or be interfaced directly with other onboard system(s) and data collection device(s). Such OBUs could provide audible or visual alerts and provide other information. The user interface can include a variety of devices, such as a keyboard and/or monitor. The monitor is preferably a touchscreen. The monitor can provide the engineer with various options to control operations or configurations of the train (e.g., number of engines in consist and the like), provide commands and recommendations from central control (e.g., recommended speed and/or acceleration for a section of track, provide data input regarding the train state (e.g., stopped for loading, stopped for unloading, stopped due to malfunction, and in motion or transit) or environmental conditions, transmit text messages to the remote server, receive text messages from the remote server, and provide the engineer with views of the data transmitted and/or received. While the OBU is discussed with reference to displaying commands to engineers, it is to be understood that specified operational aspects for many trains will be controlled remotely rather than locally.

Sensors 112a-n can be any suitable sensor for collecting desired data. For example, the sensors can be infrared sensors currently available on the market or other specially created sensors. Examples of other sensors include humidity sensors (e.g., hygrometers), barometers, anemometers, light sensors (e.g., photodetectors and pyranometers), thermometers configured to measure ambient temperature, video imaging devices, wind vanes, and rain gauges. The rail sensors 112 are commonly attached to the underbody of the train 100 to monitor rail 120 and ambient temperatures, as the train moves along the rail lines. The sensors can also collect other train-related information, such as, for example, engine temperature, oil and/or fuel pressure, revolutions per minute of a motor, engine, or rotating member, train speed, train mileage (e.g., by an odometer), train direction of travel (e.g., by a compass), and train acceleration. Other wired or wireless sensors can be stationary and positioned near the track, such as in pods or rail-side units. In one configuration, the sensors include a still and/or motion video imaging device to provide still or full motion images to the remote server. In one configuration, the sensors include a microphone to provide audio to the remote server. Analog-to-digital conversion is employed, as needed, to convert analog signals from sensors to digital format. The sensors can also collect/transmit touch and sensor inputs, including camera images and security information (including, without limitation, facial recognition hits and time, location and details with or without images).

Other data could also be collected from engineers by means of manual inputs using the user interface.

Sensed or inputted data would be location-, date- and time-stamped as collected onboard and as later received at the central servers.

One or more such sensors per train can be used with one or more OBUs.

Examples of sensed and manually inputted data include ambient temperature, rail 120 temperature, selected video images, ambient humidity, ambient pressure, visibility, rail bed temperatures, current train velocity and/or acceleration, cloud conditions, wind bearing and velocity, train bearing, train physical location, operational state or status of the train, engine parameters (e.g., oil pressure, engine temperature, fuel levels, and the like), number of cars in the consist, weights of the cars, and the like.

Sensors and OBUs installed at the front of the train can provide early warnings as to current conditions and, in the case of hot tracks, employ appropriate algorithms to provide localized and/or system-wide alerts when the length and weight of the train are expected to raise rail temperatures to dangerous or otherwise undesirable levels. OBUs farther back on the train 100 can monitor actual temperature rises, and provide data to help refine and enhance the algorithms.

For example, sensors can be positioned at the front and rear of the train to measure rail temperature. The sensor at the front of the train would provide ambient rail temperature while that at the rear of the train would provide the elevated temperature after passage of the train. The difference of the two temperatures provides the delta temperature caused by passage of the train. The delta temperature can be used to evaluate the thermal effect of the train's passage on the rail temperature of a selected block, route, or other defined section of rail. The delta temperature can be significant for long freight haulage trains.

In addition to train-specific data, train vehicles so equipped may also be used for detailed rail profiling, manually and/or through cameras and other equipment, while the train passes over sections of track. This may include collecting data regarding shaded and windblown rail segments during various times throughout the year, positions of nearby buildings along the section of track, positions of bridges, viaducts, tunnels, portals, and other features that can impact rail temperature; marking sections of track so that very specific information can be recorded and relayed; and noting maintenance activities such as rail, tie, and rail bed repairs, debris clearance, weed spraying or other maintenance actions needing to be performed. Times, locations, and other conditions and information can be recorded with such events to preserve and generate appropriate reports and records, as well as for separate processing and analysis, accounting, materials inventory, purchasing, etc.

Referring to FIG. 1B, an exemplary display 180 of the user interface 172 is shown. The display 180 can be mounted in the cab of a rail vehicle and can include associated speakers as well as communication capabilities such that cameras, microphones, and other devices can be associated with the OBU. The display 180 includes one or more display portions 182, 184, 186, and 188 and one or more buttons 190. The exemplary display portions include a map 182 (displaying rail lines, blocks, or sections of tracks, rail grades, and/or rail profiles, and surrounding features in a selected area), radar 184 (displaying current (Doppler) radar, weather statistical information, and other weather information, such as by a feed (e.g., streaming media) from a selected weather service), rail information 186 (displaying, such as in a color-coded map, sections of rail and current rail temperatures and/or profiles) and train information 188 (displaying, such as in a color-coded map, the trains in a selected area and their statuses, operations, and directions of travel, audio and/or video feeds from a selected train, and the like).

In one configuration, the train information 188 can depict the locations of the subject train as well as the other trains in a selected area relative to the subject train, using an icon denoting each train. The icon color can be varied to indicate differing rail vehicle states. Text and/or visual (camera) information can be depicted on the map adjacent to or associated with each icon. The text information can describe selected state information associated with the train, such as a train identifier, direction of train travel, train speed, status of the train's location signal, train status and activity, and timestamp of the last data update for the identified train. The map can also depict, for one or more selected rail vehicles, a trace route over a selected period of time. A trace route indicates the path of travel of the train over the selected time period. The map can also display reported condition(s) and status of the train. Additionally, the display can show the operation recommendations or commands for the specific train, which the engineer may accept and, in some configurations, modify. Such modifications and actual applications implemented throughout a route would then be transmitted back to the central server 212 and saved as part of the history of actions taken in the relevant area or region or section of track.

This display 180 allows for relatively unrestrained, dynamically generated, train and location-specific information to be accessible to the train or, in general, to any location. This is in contrast to the relatively limited capabilities previously available through text messaging or oral communications via phone or radio.

A dynamically generated webpage at a respective Universal Resource Indicator or Locator (URI or URL) has the versatility to display one or more of images and multimedia (and audio through an associated speaker) and provide information that is as current as possible, depending of course on the availability of network connections in the area.

The display of information can include without limitation a seamless integration of various types of information, such as weather radar loops, weather forecasts as well as current conditions, projected, historic, and current rail conditions (as determined by other trains), rail grades, rail profiles, and camera images. It also allows the rail vehicle to directly communicate with one or more of central dispatch or control and other engineer(s) through messaging as well as communicate with other trains through the remote server. More than one server may be joined to enhance processing power and capabilities, as well as to integrate data from multiple states and other entities.

One or more of the OBUs would be designated the "master" OBU and therefore be responsible and configured to send data back to central servers for more in depth processing with data from other sources. In one configuration, the OBUs collect sensed data along the rail lines as the host train moves along the lines and periodically or continuously transmits the sensed data to the central server and, if out of range of the central server, buffers the sensed data for later transmission when the master OBU is again within central server range. Information collected from third party sources may include weather data, for example from the National Weather Service, forecasts, and local and regional radars and related information such as front location, snow depth, wind conditions, as well as current rail conditions. Information collected from weather stations and weather pods can include current surface and ambient temperatures, humidity, wind speed and direction, wind chill, rain, drizzle, freezing rain, snow, frost, clear, and fog, and in general any weather condition, trend, forecast or information. Other types of information that can be gathered or otherwise calculated from gathered data include historic, projected and/or current rail conditions or profiles, physical location, recommended and/or maximum train speed and/or acceleration, video images of a selected train's exterior environment or the train's interior or exterior, and audio of the selected train's interior. Such information can be displayed and updated manually or on an automated basis.

Information from other sources may be collected through server-to-server links. All information can then be stored and processed on the remote server or a combination of the servers working together. The stored and processed information can be accessed locally and directly by central dispatch or control room (such as for automatic train control) and internal personnel, by dispatch assistants or related offices or through mobile devices such as cell phones and PDAs, or remotely by rail vehicles and other in-vehicle systems through, for example, a wireless connection.

A Distributed Processing Network Embodiment

Figure 2:
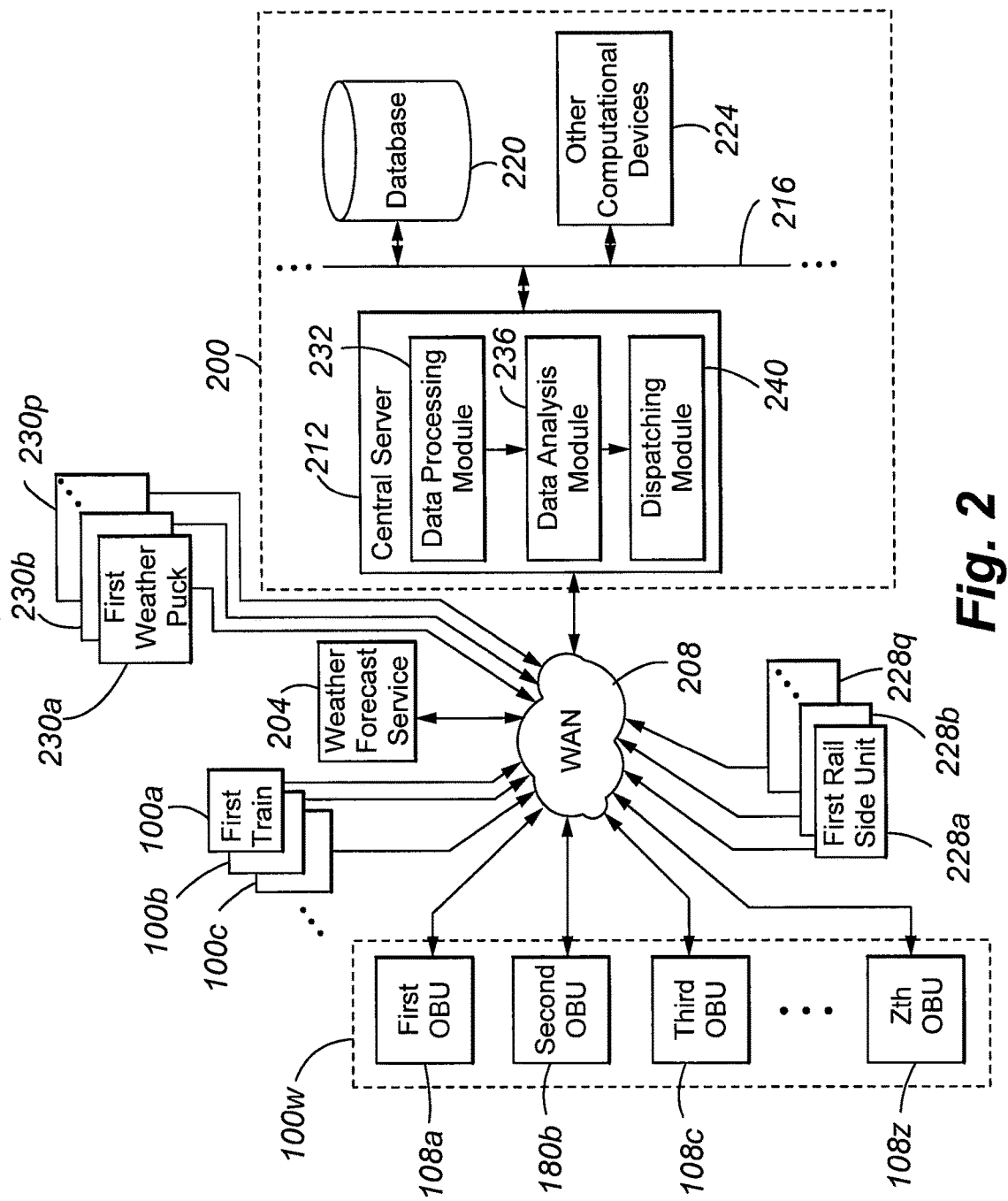
FIG. 2 is a network architecture according to an embodiment.

Referring now to FIG. 2, a distributed processing network architecture according to an embodiment is presented. The architecture includes an enterprise network 200, weather forecast service 204, a plurality of trains 100a-w, a plurality of weather pucks (or pods) 230a-p, and a plurality of rail side units 228a-q in communication with one another via Wide Area Network (WAN) 208. Each of the trains will, in turn, include location modules, sensors, and OBUs. For example, the train 100w includes first, second, third . . . nth OBUs 108a-z.

The enterprise network 200 includes a central server 212 in communication via Local Area Network (LAN) 216 with one or more database(s) 220 and other computational devices 224.

The central server 212 can be any suitable communications server and receives sensed data from and provides information to the first, second, third, . . . zth OBUs 108a-z. In one configuration, the WAN 208 is a wireless network, and the server 212 is capable of wirelessly communicating with the various OBUs 108.

The database 220 can include a variety of information. The database 220, in one configuration, includes a plurality of identifiers and, for each identifier, current and historic data sensed by an entity corresponding with the identifier. The identifier can be associated with a train, a rail vehicle, and/or a specific OBU 108. When the identifier is associated with a train or an OBU on a train, the stored data can further include the train parameters, such as train velocity, acceleration, and travel direction and location, for each train engine, engine revolutions-per-minute, engine temperature and oil pressure, fuel level, battery amperage, battery voltage, mileage per gallon, and other onboard warning systems and sensor readings, the number and types of rail vehicles in the train or consist, the length and type of the train, the cumulative weight of the train or individual rail vehicles, the type of freight carried by the train, whether the train is loaded or unloaded, the number of passengers being carried by the train, video images of the train's exterior environment or the train's interior or exterior, audio of the train's interior, engineer identifications, instructions, directions, and other information that can be displayed, sensed, and/or input manually or on an automated basis. Whether the OBU is rail-side or mounted on a train, the database includes, for the train or OBU identifier, currently sensed weather conditions (such as temperature, humidity, wind speed and direction, wind chill, raining, snowing, blowing snow, foggy, clear, overcast, cloudy, and barometric pressure), rail conditions (e.g., rail temperature, icy, snow-packed, snow depth, frosty, wet, dry, rail coefficient of friction, rail in flooded location or flood plain, black rail conditions, etc.), train or OBU spatial location (e.g., Global Positioning System or GPS-based location), sensed airborne chemicals or particulates and radiation levels, thermal and/or infrared imaging, and other information that can be displayed, sensed, and/or input manually or on an automated basis. The database can further include current and historic weather forecast information for specific days and times and a description of the rail lines providing, for example, topological information, rail line mapping coordinates, rail bed type and composition (e.g., rail road tie type and underlying bed (e.g., ballast) type and composition), information regarding nearby features (e.g., road crossings, bodies of water, buildings, foliage, and the type), and the like, and train schedules and traffic information along various rail routes (as the amount of traffic can impact significantly the temperatures on a given line).

The other computational devices 224 can include personal computers, laptops, and the like. In one configuration, the computational devices are workstations for human operators or monitors.

The weather forecast service 204 can be one or more services providing weather forecasting information. An example is the National Weather Service and general or regional weather forecasting services. As discussed below, the weather information is used to better predict short term and even longer predictions for anticipated rail temperatures and to thus help identify problematic stretches, best routing alternatives, calculate updated schedules, etc. Alternatively, the weather forecast service refers to weather stations.

The rail side units 228 are stationary units positioned adjacent to the rail lines at strategic locations. The rail side units are similar, if not identical, to the OBUs 108. They are frequently positioned along less frequently traveled sections of tracks and/or at frequent problem areas of the tracks.

The weather pucks 130a-p are available for use in areas where there are no full weather stations and installing one would be impractical and cost-prohibitive. The application involves a fixed, instead of a mobile, application of similar technology and processes to provide an inexpensive alternative for regions that currently do not have fill weather stations, making accurate data collection possible in areas that have historically been void of such data collection. These devices generally contain an infrared sensor capable of measuring ambient and surface temperatures, and a modem that allows the device to transmit the collected data back to the information management system 100. It is possible to add additional sensors, cameras, and/or other related equipment to the weather pods in order to enhance the accuracy. The data is sent back to the central server 212 where it is displayed or directly used, or where it is applied to algorithms or modeling software with other known or separately collected weather characteristics to enhance interpretation and generate warnings, monitoring alerts, e.g., to one or more of a rail vehicle, rail-side sign, central dispatch, etc, and information enhanced maps on the display 180.

Temperatures could be recorded in the field with a corresponding time stamp. The time stamp of the in-field system, as with the in rail vehicle system, can be automatically synchronized to UTC. The information could then be transmitted to the central server 212. If the system were unable to establish a network connection, the data could be stored in the OBU and transceiver 150 and transmitted once a connection could be established.

One exemplary purpose of the weather pods is to collect basic information (e.g. ambient and surface temperatures) and transmit the data to the central server 212 to be processed with other known or collected information to provide a more enhanced and accurate depiction of the different weather conditions at various locations which will ultimately aid to better predict weather conditions and increase ability to effectively monitor rail condition and profile and control rail traffic speeds over sections of track.

The WAN 208 can be any wired and/or wireless network employing suitable communication protocols. The data collected from various sources and the corresponding reports and recommendations and commands sent back to the trains can be transmitted to the OBU in the cab through a variety of public and private wireless networks as well as land-lines and/or wired networks or via satellite or via the rails themselves (such as in the automatic train protection system). Commonly, the WAN 208 is a wireless network. The wireless network 708 can be any type of wireless service and/or air interface, such as Advanced Mobile Telephone Service or AMPS, Digital Advanced Mobile Telephone Service or D-AMPS, Digital Communication Service or DCS1800, Global System for Mobile Communications/General Packet Radio Service or GSM/GPSR, North American Digital Cellular, Personal Communications Services, Personal Digital Cellular, Total Access Communication System, High Speed Downlink Packet Access or HSDPA, Enhanced Data GSM Environment or EDGE, 1×RTT CDMA, CDMA2000, Evolution Data Optimized or EVDO, Digital Enhanced Network or iDEN, Specialized Mobile Radio or SMR, 802.11x, WiMAX or 802.16, and other public and private networks, with Frequency Division Multiple Access or FDMA, Time Division Multiple Access or TDMA, Code Division Multiple Access or CDMA. Cellular Digital Packet Data or CDPD, Wideband CDMA or WCDMA/UMTS, or others. The public or private network 708 can be either landline or wireless. Wireless networks can be operated by one or more private or public networks, including carriers, such as Sprint™, Nextel™, Verizon™, Cingular™, Alltel™, Western Wireless™, AT&T Wireless™, Unicell™, Westlink™ and others, as well as affiliates thereof. If commercial wireless carriers, such as Sprint™, Nextel™, and Verizon™, are utilized, the information delivery system has the ability to accommodate and work with different types of IP addresses, including static, dynamic, and spoofed addresses. Dynamic and spoofed IP addresses are typically assigned to mobile devices. However, this system does not require carriers separately to provide dedicated lines and/or fixed IP addresses. Bandwidth and/or transmission speeds, and/or the frequency and method of data transmissions, may be intentionally limited (by setting appropriate modem parameters) to qualify for favorable telemetry rates.

In one configuration, information is typically converted into a selected form, packetized, and transmitted over the wireless network. The form of the information can be in accordance with any selected language, such as the eXtensible Markup Language or XML, the HyperText Markup Language or HTML, Remote Method Invocation or RMI, or Direct Socket Connections. The packets can be transported using any suitable protocol, such as the Transport Control Protocol/Internet Protocol suite of protocols, Simple Object Access Protocol, or User Datagram Protocol.

The OBU and transceiver 150 check for updates from the central server 212 and download the same when present. These updates can be downloaded as the engineer requests or on an automated basis. The OBU can be used for example to send information to the rail vehicle or to change programming and/or remotely access the rail vehicle, even when otherwise protected by dynamic and spoofed IPs. One example of this would involve updates to menu items and/or applications, which can be posted to a central server 212. The OBU can then be set to periodically or upon certain conditions check the central server for updates and if present, download and install the same to itself or other onboard systems and/or run applications. This can be done despite the inability of a central computer to communicate with the trains.

The OBU is also compatible with 3G and other wireless technologies. 3G technologies are the third-generation technology in the context of mobile-phone standards and are associated with wide-area wireless voice telephony and broadband wireless data.

Included in the memory of the central server(s) 212 ("data collection server(s)" may also serve as the "central processing system") are a data processing module 232, data analysis module 236, and dispatching module 240.

The data processing module 232 stores sensed data from a given train in the database 220.

The data analysis module 236 combines, in one configuration, the stored sensed data with one or more of the following: data from other trains, current and forecasted weather information, historical data and trends, and track profiles to create specialized prediction models for rail conditions along the applicable lines. The prediction models can be used to select the current of traffic, traffic mode (e.g., freight mode, rail passenger only mode, etc.), schedules (e.g., the direction, number, and movement of one or more trains), timetables, number of trains per hour, average, mean, median, lowest or highest train length, average, mean, median, lowest or highest train speed, average, mean, median, lowest or highest train acceleration, and train routes.

In one configuration, the data analysis module 236 applies predictive models to the stored data to determine, for a given month and/or day of the year and given weather conditions and selected section of track, predicted temperatures along the selected track segment and/or rail temperature trends. In making these predictions, the model can include the type and composition of the ties and rail bed along the section of track, the likely sun exposure of the tracks in the section of track in view of nearby sun blocking features (e.g., foliage and buildings), the length and weight of a selected train passing over the section of track, and expected and/or actual traffic from other rail vehicles passing over the section of track. The data analysis module 236 can even predict rail temperature increases over the length of the train. The predictive models, in one configuration, resemble modeling software used for predicting road conditions based on ambient weather conditions and road parameters (e.g., type and composition of road surface and bed).

In one configuration, the module 236 applies predictive modeling algorithms based on accumulated historical data (which will to some extent itself indirectly incorporate rail profile information, e.g., the profile for how a section of rail reacts will inherently reflect to some extent the rail profile in terms of rail bed type and composition and the like, even though profile details are not at this level recorded and incorporated). In this configuration, the bed type and composition and presence of nearby sun-blocking objects are ignored. The module 236 bases its rail temperature determinations purely upon historically and currently measured rail temperatures.

In one configuration, the module 236 incorporates into the predictive modeling algorithm of the prior configuration the effects rail profiles and other associated predictive modeling refinements (e.g., rail way characteristics, what the rail bed is composed of, whether the rail bed is over water, the height of the rail bed above the surrounding surface, time of day, time of year and angle of sun, weather forecasts from National Weather Service or NWS or other sources, historic trends, profiles and other available data, cloud conditions, fog conditions, shading, etc.). This is a more sophisticated algorithm than the prior configuration but is more computationally intensive.

In one configuration, the module 236 selects a length, segment, or section of track, determines, over a selected period of time, an (average, mean, median, lowest, or highest) temperature of the rail, such as in the presence or absence of rail traffic during the time period, compares the actual (average, mean, median, lowest, or highest) rail temperature against the (average, mean, median, lowest, or highest) ambient temperature over the time period to determine a delta value. The forecasted or actual ambient temperature can be mapped against historic (average, mean, median, lowest, or highest) ambient temperatures to provide the corresponding delta value, which when added to the forecasted or actual temperature approximates the rail temperature. The predictive algorithm may be made more sophisticated by adding a third variable, which is the average, mean, median, lowest or highest rail traffic over the selected time period. When mapping is performed for the track section or segment, a table is selected using not only the predicted or actual temperature but also the predicted or actual rail traffic over the segment.

In one configuration, the module 236 applies modeling algorithms that include the effects of natural events, such as actual or potential flooding, snow depth, and drifting of snow (which produces varying depths of snow over the tracks).

In one configuration, the module 236 uses modeling algorithms to make predictions of the impact of selected hypothetical train routing or dispatch scenarios on track conditions. For example, the module 236 models the effects on rail conditions from moving rail traffic from one line to another, or, for a given routing scenario, the effects from using selected combinations of shorter or longer or loaded or unloaded trains.

In one configuration, the module 236 compares current with historic images of objects and, based on the comparison, performs user authentication or identifies alarm conditions.

In one embodiment, historical and subsequent data is used by the data analysis module 236 to refine prediction models. Since data is collected along entire lengths of track, collected data is used to help generate automatically and continually refined profiles. Algorithms for heat buildup for various train lengths and weights are employed, along with other profile characteristics collected for various stretches of track. Profiles in surface transportation are often manually compiled and supplemented with accumulated data, but newer techniques involving optical and other equipment could also be employed. In the latter case, for example, onboard cameras and pixel analysis could aid in automated profiling for shaded areas, reflective surroundings, rail bed characteristics, and other area impacts relevant to analysis.

In one configuration, the module 236 compares information or a given sensed parameter to identify temporal trends or differences and, if necessary, generates appropriate alarms. The alarms can be logged internally and/or forwarded to the respective train via a modem system. The engineer and/or automated components thereof can then take appropriate remedial action to address the cause of the alarm. It can prepare selected reports on the information. It can log events. The enterprise network 710 can also provide communications to the modem system. The communications can, for example, provide instructions to the engineer, such as train operation and dispatch commands, and/or to automated components of the train itself to remotely control selected train operations.

The dispatching or central control module 240 generates dispatching instructions based on rail conditions provided by the data analysis module 236 and generates alarms and commands/instructions to specific trains based on the rail conditions. The module 240, for instance, generates internal and external (OBU) client notifications and reports (e.g., internal alerts for problem areas along the rail line, client notifications (automate, email, mobile messages whatever) regarding delays or revised schedules, reports, commands/ instructions regarding speed and acceleration levels to maintain selected rail conditions (e.g., block signals, cab signals, home signals, moving block train control signals, train protection signals, and the like). The dispatching module 240 and OBU 108, collectively or individually, can provide visual and/or audible alerts when selected rail parameters are exceeded and on board access to updates and revised instructions, applicable weather and radar, messages and alerts, and other information. When actual or anticipated temperatures exceed specified thresholds (high or low), alerts and recommendations would be issued from the central server or servers to applicable dispatchers, engineers (via OBUs or otherwise) and other interested parties. Any and multiple available means of communication could be used, including without limitation, email and text messages, data transfers, visual displays via maps or otherwise, text to speech messages via cellular, radio or/or other means. In one configuration, the dispatching module 240 receives, from the data analysis module 236, information as to actual or recommended speed reductions and transfers the information to other systems or directly processes it to generate revised routing and schedules.

In one configuration, alerts are sent out by the OBU or central server 212 via email or text messages to the same devices, as well as via a call out for a voice alert via telephone or cell phone, or fax messages. Any of the devices can also be used to manually send a command to the stationary equipment 231, if desired.

Once the central server 212 determines which train is requesting information by either manual or automated updates, a train-specific report or aggregate of information that will be most relevant for the requesting train as well as a train-specific combination of radar, forecasts and treatment recommendations are generated. Applying various techniques and software processes to the collected data produces this information and recommendation. The information and recommendation is then dynamically placed on a webpage or into another data format for transmission to the field systems.

In one embodiment, the architecture applies a similar architecture and modern technology to that described in U.S. patent application entitled "Smart Modem Device for Vehicular Roadside Applications". Ser. No. 11/363,581, filed Feb. 27, 2006, and U.S. patent application entitled "Information Delivery and Maintenance System for Dynamically Generated and Updated Data Pertaining to Road Maintenance Vehicles and Other Related Information", Ser. No. 12/147,837, filed Jun. 27, 2008, each of which is incorporated herein by this reference. As described in the applications for tired vehicles, the collected data may be used to populate, in real time, maps. In the maps, each engine or train would be indicated by an icon, the color of which could be related to a status of the corresponding train (e.g., idle, moving, pulling empty cars, pulling loaded cars), freight train versus passenger train, type of freight being pulled, whether or not on schedule, and other train-related parameters. Each icon can have a drop down description of these parameters. Additionally, icons can be used to represent track or weather conditions at selected points along the track. The icons can be generated when the conditions are unacceptable or exceed acceptable thresholds. Lines, routes and/or segments thereof can themselves be color coded for current temperatures, predicted problems, bottlenecks, and other parameters.

Module Operations

Selected operations of the various modules will now be discussed.

Figure 3:
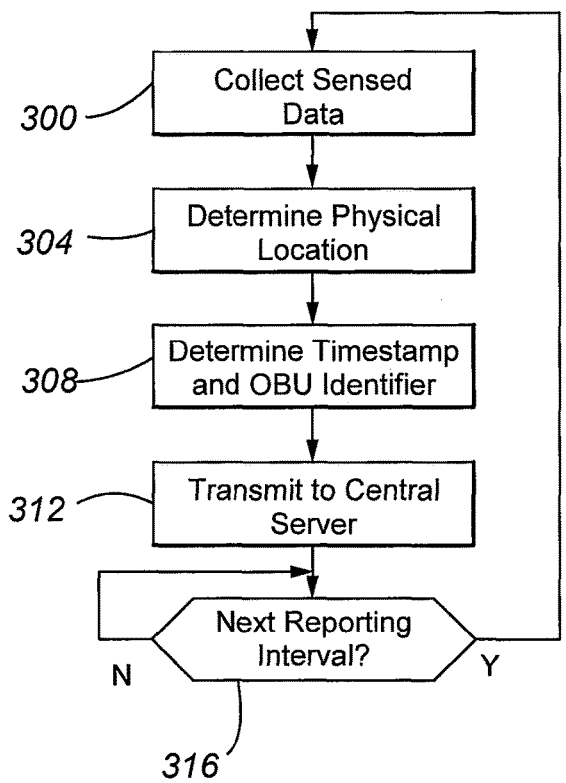
FIG. 3 is a flow chart depicting a data collection operation according to an embodiment.

FIG. 3 depicts the data collection operation performed by the OBUs 108.

In step 300, the OBU 108 collects sensed data from one or more sensors 112 and/or from one or more other OBU's on the train.

In step 304, the OBU 304 determines, from the location module 116 and when the sensed data is obtained directly from a sensor, a physical location of the train when the sensed data was measured.

In step 308, the OBU determines, when the sensed data is obtained directly from a sensor, a timestamp when the sensed data was measured and OBU identifier for the train.

In step 312, the OBU transmits the information to the central server 212 over WAN 208 or to a master OBU located elsewhere on the train, such as in the cab.

In decision diamond 316, the OBU determines whether the next reporting interval has arrived. Decision diamond 316 is repeated until the next reporting time arrives. When the next reporting time arrives, the OBU returns to and repeats the foregoing steps 300, 304, 308, and 312.

Figure 4:
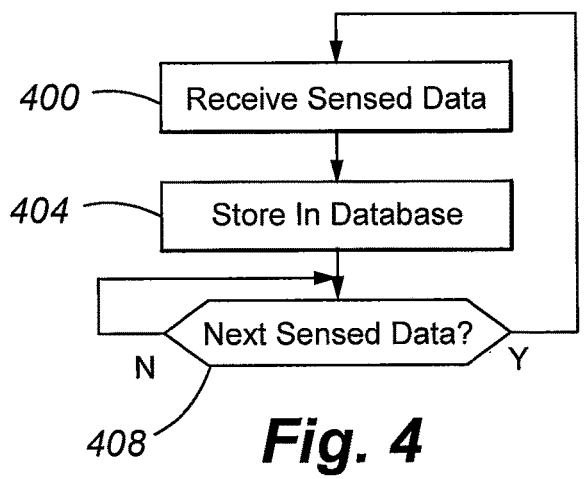
FIG. 4 is a flow chart depicting an operation of the data processing module according to an embodiment.

An operation of the data processing module 232 will now be described with reference to FIG. 4.

In step 400, the module 232 receives sensed data from an OBU or rail-side unit 228.

In step 404, the module 232 stores the sensed data in the database 220 with reference to an identifier indicating a source of the sensed data. The identifier is used to locate the sensed data relative to a corresponding segment of track. This is done using the location information for train-mounted OBUs 108 or using known location information for rail-side units 228.

In decision diamond 408, the module 232 determines whether it has received further sensed data from another OBU or rail-side unit. Decision diamond 408 is repeated until the next reporting time arrives. When the next reporting time arrives, the module 232 returns to and repeats the foregoing steps 400 and 404.

Figure 5:
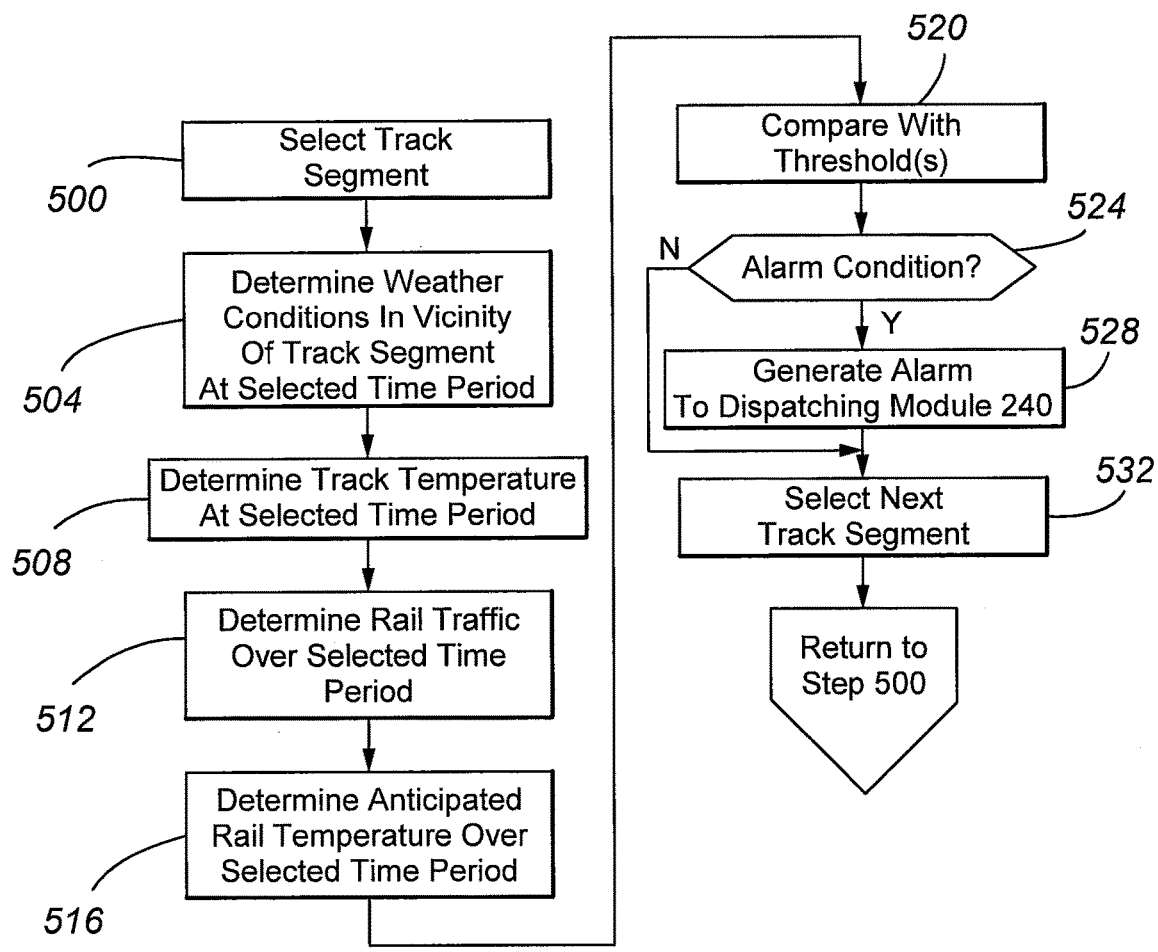
FIG. 5 is a flow chart depicting an operation of the data analysis module according to an embodiment.

An operation of the data analysis module 236 will now be discussed with reference to FIG. 5.

In step 500, the module 236 selects a track segment or section.

In step 504, the module 236 determines (average, mean, median, lowest, or highest) weather conditions in the vicinity of the selected track segment over a selected period of time.

In step 508, the module 236 determines the (average, mean, median, lowest, or highest) track temperature for the selected segment over the selected time period.

In step 512, the module 236 determines the actual and/or expected rail traffic over the selected rail segment over the selected time period.

In step 516, the module 236 determines, based on the actual and/or expected rail traffic over the selected rail segment, an anticipated (average, mean, median, lowest, or highest) rail temperature for the selected track segment over the selected time period.

In step 520, the module 236 compares the track temperature with one or more thresholds.

In decision diamond 524, the module 236 determines whether the track temperature fails to satisfy the thresholds and an alarm condition therefore exists.

When an alarm condition exists, the module 236, in step 528, generates an alarm to the dispatching module 240.

When there is no alarm condition or after step 528, the module 236, in step 532, selects a next track segment for analysis and returns to and repeats step 500.

Figure 6:
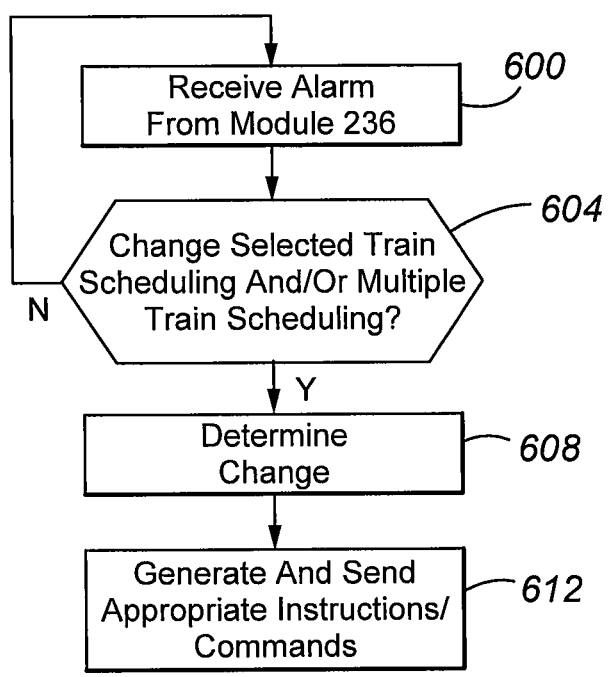
FIG. 6 is a flow chart depicting an operation of the dispatching module according to an embodiment.

An operation of the dispatching module 240 will now be discussed with reference to FIG. 6.

In step 600, the module 240 receives an alarm from the data analysis module 236.

In decision diamond 604, the module 240 determines whether or not to change a selected train's scheduling or operating parameters (e.g., speed, acceleration, and routing) and/or scheduling or operating parameters for multiple selected trains. If not, the module 240 returns to and repeats step 600. If so, the module 240, in step 608, determines the change desired, and, in step 612, generates and sends an appropriate instruction/command to the affected trains or other automated components (e.g., track switches to redirect trains onto a different route, etc.).

EXAMPLE

In one embodiment, ambient and surface temperatures are collected by an OBU 108 attached to a location module 116, particularly a GPS puck, and an underbody infrared sensor 112 mounted over one or both rails 120. An optional monitor or display would be attached to the OBU, as would any other interfaces to other onboard systems and sensors.

Temperatures would typically be displayed on the monitor and/or applicable gauge, and would be periodically sent to the central servers via available communications (cellular, radio, or other wireless data collection/communication medium available along the tracks). Data not immediately transmitted (due to specification or lack of applicable communication coverage in a given location) would be stored and transmitted when later back in an area where coverage and connectivity permit.

When temperatures reach specified ranges, additional alerts and associated data would be displayed for the onboard engineers and be sent to the central server(s) as with the periodic information noted above.

The periodic information, along with any special alerts would be processed in conjunction with applicable weather, historic and other information to generate current and anticipated temperatures along various routes. Where temperatures are anticipated to be outside specified thresholds, the alerts and recommendations could be transferred electronically to applicable trains scheduled over such route(s) and map based displays could be provided showing projected problematic routes (with or without more granular detail regarding particular stretches within the route). Detailed data feeds could be set up to also relay such information to other systems.

Recommended alternate routes based on other weather, speed, volumes and other factors could be generated. If/then functionality could be included as noted above.

If, in the above example, a mile long train of coal traveling south from the Powder River Basin mines in Wyoming begins running into high temperatures in Colorado in mid-morning, data being collected from that train would be both monitored by the OBU and transmitted to the central servers (communications permitting). If thresholds in the OBU are surpassed, the OBU itself could generate a warning. Assuming though for purposes of the example, the temperatures are high but not at or in excess of a threshold, the temperatures would nevertheless be analyzed at the central servers along with information from other trains ahead on the track, and the applicable weather and historic information, profiles, etc. Information from other trains will provide last reported information ahead, along with the rate of temperature increase. The weather information will provide applicable information as to whether and to what extent the rest of the line will be in the sun (maximum thermal heating) or whether and to what extent there will be shade or afternoon rain to cool the tracks and/or at least maintain satisfactory temperatures. Historic information from prior days and/or years, to the extent available, or over time compiled, can be used to help refine the algorithms, profiles and track characteristics. With trains on some tracks spaced relatively soon after each other, it will be possible to generate profiles, monitor entire stretches of track, and forecast rail temperatures more accurately and with more lead time than ever before or ever possible with limited, fixed location equipment.

As will be appreciated, OBUs and rail-side units could have full processing capabilities and functionality of an SMD as described in the above-referenced applications, but they could also be simpler datalogging/modem units, or a combination thereof.

A number of variations and modifications of the invention can be used. It would be possible to provide for some features of the invention without providing others.

For example in one alternative embodiment, the present invention is applied to a monorail transport system.

In another alternative embodiment, the invention is applied to sub-surface rail applications, such as a subway or mine haulage system.

The exemplary systems and methods of this invention have been described in relation to information management. However, to avoid unnecessarily obscuring the present invention, the description omits a number of known structures and devices. This omission is not to be construed as a limitation of the scope of the claimed invention. Specific details are set forth to provide an understanding of the present invention. It should however be appreciated that the present invention may be practiced in a variety of ways beyond the specific detail set forth herein.

Furthermore, while the exemplary embodiments illustrated herein show various components of the system colocated, certain components of the system can be located remotely, at distant portions of a distributed network, such as a LAN, cable network, and/or the Internet, or within a dedicated system. Thus, it should be appreciated, that the components of the system can be combined in to one or more devices, such as an information management system, or collocated on a particular node of a distributed network, such as an analog and/or digital communications network, a packet-switch network, a circuit-switched network or a cable network.

It will be appreciated from the preceding description, and for reasons of computational efficiency, that the components of the system can be arranged at any location within a distributed network of components without affecting the operation of the system. For example, the various components can be located in one or more of the information management system and information delivery system. Similarly, one or more functional portions of the system could be distributed between a communications device(s), such as a PDA, and an associated computing device.

Furthermore, it should be appreciated that the various links connecting the elements can be wired or wireless links, or any combination thereof, or any other known or later developed element(s) that is capable of supplying and/or communicating data to and from the connected elements.

These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

In yet another embodiment, the systems and methods of this invention can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, or aspects, includes components, methods, processes, systems and/or apparatus substantially as depicted and described herein, including various embodiments, configurations, aspects, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The invention claimed is:

1. A system, comprising:
a server configured for communication with a plurality of moving consists, each consist comprising at least one rail vehicle, wherein the server:
(a) receives over a network, from the plurality of consists, a plurality of sets of collected information, each of the sets of collected information comprising a consist physical location and observed weather conditions and rail temperatures in an area of the respective consist;
(b) receives over a network, from a plurality of stationary inputs, a plurality of sets of stationary information, each of the sets of stationary information comprising at least one of observed weather conditions or rail temperatures in an area of the respective stationary input;

(c) wherein the server is operable to process a predictive rail temperature algorithm for predicting a rail temperature and/or a trend in rail temperature for a selected section of track;

(d) wherein the predictive rail temperature algorithm factors the information provided to it and determines an instruction calculated to influence the rail temperature for the selected section of track; and (e) wherein the server sends, over the network, the instruction to a user.

2. The system of claim 1, wherein the stationary input is selected from the group comprising rail-side units, weather pucks, weather pods, rail-side de-icing sprayers, rail-side signs and rail-side friction enhancers.

3. The system of claim 1, wherein additional data, in addition to the observed weather conditions and rail temperatures in an area of the respective consist, is provided to the server.

4. The system of claim 3, wherein the additional data is collected from the user by means of manual inputs using a user interface.

5. The system of claim 3, wherein the additional data is collected from sensors mounted on the consist.

6. The system of claim 3, wherein the additional data is selected from the group comprising ambient temperature, selected video images, ambient humidity, ambient pressure, visibility, rail bed temperatures, current train velocity, current train acceleration, cloud conditions, wind bearing, wind velocity, train bearing, operational state or status of the train, engine oil pressure, engine temperature, fuel level, number of cars in the consist and weight of the cars.

7. The system of claim 4, wherein the user interface is selected from the group comprising a keyboard and a touchscreen monitor.

8. The system of claim 4, wherein the user interface includes options to control operations or configurations of the train, provide commands and recommendations from central control, provides data input regarding the train state, provides environmental conditions, transmits text messages to the remote server, receive text messages from the remote server, and provides the user with views of the data transmitted and/or received.

9. The system of claim 4, wherein the user interface provides audible or visual alerts to the user.

10. The system of claim 1, wherein the plurality of sets of collected information are sent to the server by at least one connection manager and at least one connection monitor, and when the Quality of Service of the connection is unacceptable or the link used by the connection is down, the connection monitor causes the connection manager to reestablish the communication session by setting up another connection.

11. A method, comprising:

(a) receiving over a network, from a plurality of moving consists, each consist comprising at least one rail vehicle, and by a server, a plurality of sets of collected information, each of the sets of collected information comprising a consist physical location and observed weather conditions and rail temperatures in an area of the respective consist;

(b) receiving over the network, from a plurality of stationary inputs, a plurality of sets of stationary information, each of the sets of stationary information comprising at least one of observed weather conditions or rail temperatures in an area of the respective stationary input;

(c) processing, by the server, a predictive rail temperature algorithm for predicting a rail temperature and/or a trend in rail temperature for a selected section of track;

(d) wherein the predictive rail temperature algorithm factors the information provided to it and determines an instruction calculated to influence the rail temperature for the selected section of track; and (e) sending by the server, over the network, the instruction to a user.

12. The method of claim 11, wherein the stationary input is selected from the group comprising rail-side units, weather pucks, weather pods, rail-side de-icing sprayers, rail-side signs and rail-side friction enhancers.

13. The method of claim 11, wherein additional data, in addition to the observed weather conditions and rail temperatures in an area of the respective consist, is provided to the server.

14. The method of claim 13, wherein the additional data is collected from the user by means of manual inputs using a user interface.

15. The method of claim 13, wherein the additional data is collected from sensors mounted on the consist.

16. The method of claim 13, wherein the additional data is selected from the group comprising ambient temperature, selected video images, ambient humidity, ambient pressure, visibility, rail bed temperatures, current train velocity, current train acceleration, cloud conditions, wind bearing, wind velocity, train bearing, operational state or status of the train, engine oil pressure, engine temperature, fuel level, number of cars in the consist and weight of the cars.

17. The method of claim 14, wherein the user interface is selected from the group comprising a keyboard and a touchscreen monitor.

18. The method of claim 14, wherein the user interface includes options to control operations or configurations of the train, provide commands and recommendations from central control, provides data input regarding the train state, provides environmental conditions, transmits text messages to the remote server, receive text messages from the remote server, and provides the user with views of the data transmitted and/or received.

19. The method of claim 14, wherein the user interface provides audible or visual alerts to the user.

20. The method of claim 11, wherein the plurality of sets of collected information are sent to the server by at least one connection manager and at least one connection monitor, and when the Quality of Service of the connection is unacceptable or the link used by the connection is down, the connection monitor causes the connection manager to reestablish the communication session by setting up another connection.

* * * * *